(12) United States Patent
Varley

(10) Patent No.: US 9,104,298 B1
(45) Date of Patent: Aug. 11, 2015

(54) SYSTEMS, METHODS, AND DEVICES FOR INTEGRATED PRODUCT AND ELECTRONIC IMAGE FULFILLMENT

(71) Applicant: Trade Only Limited, Middleton, Manchester (GB)

(72) Inventor: Martin Roy Varley, Newport Beach, CA (US)

(73) Assignee: TRADE ONLY LIMITED, Manchester (GB)

( * ) Notice: Subject to any disclaimer, the term of this patent is extended or adjusted under 35 U.S.C. 154(b) by 0 days.

(21) Appl. No.: 14/273,950

(22) Filed: May 9, 2014

Related U.S. Application Data

(60) Provisional application No. 61/822,262, filed on May 10, 2013, provisional application No. 61/835,421, filed on Jun. 14, 2013, provisional application No. 61/937,010, filed on Feb. 7, 2014.

(51) Int. Cl.
*G06F 3/048* (2013.01)
*G06F 3/0484* (2013.01)
(Continued)

(52) U.S. Cl.
CPC ............ *G06F 3/04842* (2013.01); *B41J 29/38* (2013.01); *G06F 17/243* (2013.01); *G06F 17/30244* (2013.01); *G06F 17/30861* (2013.01); *G06K 15/005* (2013.01)

(58) Field of Classification Search
CPC .................... G06F 17/30244; G06F 17/30861; G06K 15/005
USPC ......... 715/765, 742, 757, 801, 815, 838, 839, 715/852
See application file for complete search history.

(56) References Cited

U.S. PATENT DOCUMENTS 3,968,719 A * 7/1976 Sanderson ...................... 84/454
4,014,242 A * 3/1977 Sanderson ...................... 84/454
(Continued)

FOREIGN PATENT DOCUMENTS

EP 0 642 102 A1 * 7/1994 .............. G06T 15/10
WO WO 2007030397 A2 * 3/2007 ........... G06K 19/077

OTHER PUBLICATIONS

Bing search q=label%20third%20party%20website%20 Jun. 24, 2015.*
(Continued)

*Primary Examiner* — Boris Pesin
*Assistant Examiner* — John Heffington
(74) *Attorney, Agent, or Firm* — Knobbe, Martens, Olson & Bear, LLP

(57) ABSTRACT

The disclosure herein provides methods, systems, and devices for managing, tracking, and facilitating the ordering and procurement of promotional products. Additionally, the disclosure herein provides methods, systems, and devices for aggregating, managing, and tracking promotional product procurement data in order to allow for the data mining of such information. The disclosure herein provides methods, systems, and devices for enabling the generation of a virtual canvas for creating images sized for editable areas of a promotional product, website, brochure, banner, or the like. The disclosure herein provides methods, systems, and devices for enabling the generation of a virtual canvas for creating a rotatable image of a promotional product having positioned on the promotional product a user defined image. The disclosure herein provides methods, systems, and devices for enabling the generation of a single invoice comprising an invoice amount from a supplier and an invoice amount from a third party decorator.

17 Claims, 19 Drawing Sheets

(51) Int. Cl.
*G06F 17/24* (2006.01)
*G06K 15/00* (2006.01)
*B41J 29/38* (2006.01)
*G06F 17/30* (2006.01)

(56) References Cited

U.S. PATENT DOCUMENTS

| | | | | |
|---|---|---|---|---|
| 4,832,513 | A * | 5/1989 | Ikekita | 400/61 |
| 4,961,154 | A * | 10/1990 | Pomerantz et al. | 345/419 |
| 5,237,647 | A * | 8/1993 | Roberts et al. | 345/419 |
| 5,442,129 | A * | 8/1995 | Mohrlok et al. | 84/637 |
| 5,520,876 | A * | 5/1996 | Dobler | 264/511 |
| 5,727,138 | A * | 3/1998 | Harada | 345/420 |
| 5,777,254 | A * | 7/1998 | Fay et al. | 84/613 |
| 5,817,965 | A * | 10/1998 | Matsumoto | 84/610 |
| 5,894,310 | A * | 4/1999 | Arsenault et al. | 345/679 |
| 5,895,476 | A * | 4/1999 | Orr et al. | 715/202 |
| 5,895,477 | A * | 4/1999 | Orr et al. | 715/202 |
| 5,900,567 | A * | 5/1999 | Fay et al. | 84/613 |
| 5,952,597 | A * | 9/1999 | Weinstock et al. | 84/609 |
| 5,956,737 | A * | 9/1999 | King et al. | 715/202 |
| 6,090,027 | A * | 7/2000 | Brinkman | 493/54 |
| 6,166,314 | A * | 12/2000 | Weinstock et al. | 84/483.1 |
| 6,276,566 | B1 | 8/2001 | Zaksenberg | 222/78 |
| 6,307,140 | B1 * | 10/2001 | Iwamoto | 84/622 |
| 6,313,836 | B1 * | 11/2001 | Russell et al. | 345/419 |
| 6,336,092 | B1 * | 1/2002 | Gibson et al. | 704/268 |
| 6,589,116 | B1 * | 7/2003 | Grigoriev et al. | 463/35 |
| 6,737,572 | B1 * | 5/2004 | Jameson et al. | 84/741 |
| 6,816,833 | B1 * | 11/2004 | Iwamoto et al. | 704/207 |
| 7,006,952 | B1 * | 2/2006 | Matsumoto et al. | 703/2 |
| 7,016,841 | B2 * | 3/2006 | Kenmochi et al. | 704/258 |
| 7,111,252 | B1 * | 9/2006 | Harris | 715/851 |
| 7,266,513 | B2 * | 9/2007 | Chalmers et al. | 705/26.1 |
| 7,391,424 | B2 * | 6/2008 | Lonsing | 345/633 |
| 7,447,558 | B2 * | 11/2008 | Pratt | 700/118 |
| 7,899,716 | B2 * | 3/2011 | Rothman | 705/26.35 |
| 8,112,721 | B2 * | 2/2012 | Nakamura | 715/838 |
| 8,294,713 | B1 * | 10/2012 | Amanieux | 345/426 |
| 8,533,580 | B1 * | 9/2013 | Xu | 715/205 |
| 8,579,620 | B2 * | 11/2013 | Wu | 425/7 |
| 8,634,089 | B2 * | 1/2014 | Keane et al. | 358/1.15 |
| 8,732,003 | B2 * | 5/2014 | Keane et al. | 705/14.1 |
| 2001/0043467 | A1 * | 11/2001 | Carpenter et al. | 362/84 |
| 2002/0032573 | A1 * | 3/2002 | Williams et al. | 705/1 |
| 2002/0032612 | A1 * | 3/2002 | Williams et al. | 705/26 |
| 2002/0036654 | A1 * | 3/2002 | Evans et al. | 345/744 |
| 2002/0085230 | A1 * | 7/2002 | Kitahara et al. | 358/1.16 |
| 2002/0161464 | A1 * | 10/2002 | Weiner | 700/97 |
| 2002/0185212 | A1 * | 12/2002 | Schaupp et al. | 156/205 |
| 2003/0056410 | A1 * | 3/2003 | Witkowski | 40/310 |
| 2003/0061217 | A1 * | 3/2003 | Whittingham et al. | 707/10 |
| 2003/0076538 | A1 * | 4/2003 | Whittingham et al. | 358/1.18 |
| 2003/0107568 | A1 * | 6/2003 | Urisaka et al. | 345/419 |
| 2003/0158786 | A1 * | 8/2003 | Yaron et al. | 705/26 |
| 2003/0161014 | A1 * | 8/2003 | Tobita et al. | 358/537 |
| 2003/0165326 | A1 * | 9/2003 | Blair et al. | 386/75 |
| 2003/0217489 | A1 * | 11/2003 | Witkowski | 40/306 |
| 2003/0218766 | A1 * | 11/2003 | Matsumoto | 358/1.13 |
| 2004/0090507 | A1 * | 5/2004 | Mabbot | 347/103 |
| 2004/0096601 | A1 * | 5/2004 | Raymond | 428/34.1 |
| 2004/0138905 | A1 * | 7/2004 | Stinson et al. | 705/1 |
| 2005/0120010 | A1 * | 6/2005 | Philpott et al. | 707/3 |
| 2005/0187106 | A1 * | 8/2005 | Laney et al. | 503/227 |
| 2005/0224571 | A1 * | 10/2005 | Kelley et al. | 235/375 |
| 2005/0224572 | A1 * | 10/2005 | Kelley et al. | 235/375 |
| 2005/0255914 | A1 * | 11/2005 | McHale et al. | 463/31 |
| 2005/0264596 | A1 * | 12/2005 | Little | 347/19 |
| 2006/0009979 | A1 * | 1/2006 | McHale et al. | 704/270 |
| 2006/0075329 | A1 * | 4/2006 | Sullivan et al. | 715/507 |
| 2006/0165240 | A1 * | 7/2006 | Bloom et al. | 381/56 |
| 2006/0202042 | A1 * | 9/2006 | Chu | 235/492 |
| 2006/0292104 | A1 * | 12/2006 | Guskey et al. | 424/70.17 |
| 2007/0043579 | A1 * | 2/2007 | Kent et al. | 705/1 |
| 2007/0051816 | A1 * | 3/2007 | Chu | 235/492 |
| 2007/0090010 | A1 * | 4/2007 | Crabtree et al. | 206/459.1 |
| 2007/0095707 | A1 * | 5/2007 | Yahiel | 206/459.5 |
| 2008/0114611 | A1 * | 5/2008 | Nichols | 705/1 |
| 2008/0168495 | A1 * | 7/2008 | Roberts et al. | 725/39 |
| 2008/0213021 | A1 * | 9/2008 | Silverbrook et al. | 400/76 |
| 2008/0238916 | A1 * | 10/2008 | Ghosh et al. | 345/419 |
| 2009/0164339 | A1 * | 6/2009 | Rothman | 705/27 |
| 2009/0202757 | A1 * | 8/2009 | Fujio | 428/34.9 |
| 2009/0256817 | A1 * | 10/2009 | Perlin et al. | 345/174 |
| 2009/0276089 | A1 * | 11/2009 | Bartholomew | 700/235 |
| 2009/0298017 | A1 * | 12/2009 | Boerjes et al. | 433/214 |
| 2010/0073198 | A1 * | 3/2010 | Wegner et al. | 340/946 |
| 2010/0211885 | A1 * | 8/2010 | Berg et al. | 715/745 |
| 2010/0245387 | A1 * | 9/2010 | Bachelder et al. | 345/633 |
| 2010/0321405 | A1 * | 12/2010 | Macinnes et al. | 345/635 |
| 2011/0050848 | A1 * | 3/2011 | Rohaly et al. | 348/43 |
| 2011/0228995 | A1 * | 9/2011 | Batman et al. | 382/128 |
| 2012/0220494 | A1 * | 8/2012 | Samuels et al. | 506/16 |
| 2012/0245841 | A1 * | 9/2012 | Spindler et al. | 701/428 |
| 2012/0245848 | A1 * | 9/2012 | Spindler et al. | 701/532 |
| 2013/0073336 | A1 * | 3/2013 | Heath | 705/7.29 |
| 2013/0073374 | A1 * | 3/2013 | Heath | 705/14.39 |
| 2013/0073388 | A1 * | 3/2013 | Heath | 705/14.53 |
| 2013/0076909 | A1 * | 3/2013 | Marti et al. | 348/164 |
| 2013/0087620 | A1 * | 4/2013 | Sharma et al. | 235/472.01 |
| 2013/0091445 | A1 * | 4/2013 | Treadway et al. | 715/762 |
| 2013/0127980 | A1 * | 5/2013 | Haddick et al. | 348/14.08 |
| 2013/0215148 | A1 * | 8/2013 | Antonyuk et al. | 345/633 |
| 2013/0278631 | A1 * | 10/2013 | Border et al. | 345/633 |
| 2014/0002342 | A1 * | 1/2014 | Fedorovskaya et al. | 345/156 |
| 2014/0002644 | A1 * | 1/2014 | Fedorovskaya et al. | 348/143 |
| 2014/0003648 | A1 * | 1/2014 | Fedorovskaya et al. | 382/100 |
| 2014/0003652 | A1 * | 1/2014 | Fedorovskaya et al. | 382/103 |
| 2014/0003716 | A1 * | 1/2014 | Fedorovskaya et al. | 382/170 |
| 2014/0003737 | A1 * | 1/2014 | Fedorovskaya et al. | 382/276 |
| 2014/0006129 | A1 * | 1/2014 | Heath | 705/14.23 |
| 2014/0267273 | A1 * | 9/2014 | Kontkanen | 345/426 |
| 2014/0370158 | A1 * | 12/2014 | Speck et al. | 426/87 |

OTHER PUBLICATIONS

Bing search q=label%20third%20party%20website%20 canvas Jun. 24, 2015.*

Bing search q=label%20third%20party%20website&qs Jun. 24, 2015.*

Bing search q=label%20website&qs=n&form=QBRE&pq= Jun. 24, 2015.*

Bing search q=rotatable+label+website&src=IE-Sea Jun. 24, 2015.*

* cited by examiner

FIG. 17

SYSTEMS, METHODS, AND DEVICES FOR INTEGRATED PRODUCT AND ELECTRONIC IMAGE FULFILLMENT

CROSS-REFERENCE TO RELATED APPLICATIONS

The present application claims the benefit under 35 U.S.C. 119(c) to U.S. Provisional Application No. 61/822,262, filed May 10, 2013, and to U.S. Provisional Application No. 61/835,421, filed Jun. 14, 2013, and to U.S. Provisional Application No. 61/937,010, filed Feb. 7, 2014. Each of the foregoing provisional applications is hereby incorporated by reference in its entirety, including specifically but not limited to the systems and method relating to integrated product and electronic image fulfillment.

BACKGROUND

1. Field

The disclosure relates generally to the fields of product manufacturing and fulfillment and image generation, and more particularly, to the fields of tracking and facilitating the manufacture and procurement of promotional product goods, and of generating images for promotional products, websites, and the like.

2. Description of the Related Art

In many industries, companies will generally provide to potential customers and/or existing customers promotional products. For example, some companies will provide pens or pencils as promotional products to potential customers and existing customers in order to establish a rapport with the customer. Other examples of promotional products include hats, shirts, toys, and other manufactured goods. In general these promotional products will be emblazoned with the company's logo and/or company name. One of the purposes of these promotional products is to ensure that potential and existing customers will remember the name of the company. By remembering the company name, the companies hope that the customer will select the company for new business.

In many instances, the process for procuring such promotional products is a two stage process. In some cases, a company will approach a distributor for procuring promotional products. In other instances, the company will not engage a distributor but rather will directly engage the promotional products suppliers. As a first step of the process, the distributor or the company will identify a supplier of raw promotional product goods, for example, t-shirts. Generally, suppliers will store raw promotional products that have not been emblazoned with a company name. These promotional products are then shipped to a decorator. After receiving the shipment of raw goods, the decorator will affix the company logo and/or name to the raw promotional products received by the supplier. For example, a decorator may receive a shipment of raw t-shirts. The decorator can then paint, embroider, and/or sew on the logo and/or company name to the raw t-shirt product received from the supplier. Oftentimes, this two-step process will result in two separate invoices being generated, one invoice from the supplier, and a second invoice from the decorator.

In general, the creation of two invoices can create confusion for a company that is only receiving ordering one type of promotional product. Additionally, the bifurcated process of buying raw materials from a supplier and shipping the raw materials to a decorator for product finalization can result in the poor tracking of the fulfillment process. Additionally, without a comprehensive tracking system, the capture of data relating to the procurement of promotional products cannot occur. The capture of procurement data can be potentially useful for data mining purposes.

Additionally, the creation of images for promotional products is often a laborious effort. In some instances, the process of creating a teammate suitable for a promotional product must be performed by a professional graphic artist. By engaging a professional graphic artists or other consulting company, the process for procuring promotional products is further complicated and made more expensive. Accordingly, there is a need for a tool for allowing individuals to generate images for promotional products without having to engage a graphic artists or other consulting company. Such a tool for allowing individuals to generate images could also be utilized not only for promotional products but also for websites, publications, or any other item that an individual would like to place an image on.

SUMMARY

The disclosure herein presents systems, methods, and devices for image generation for promotional products, websites, and other items. The disclosure herein presents systems, methods, and devices for generating a single view of or rotatable views of a virtual product sample. The disclosure herein presents systems, methods, and devices for generating a customer single invoice for a plurality of entities in a supply chain. The disclosure herein presents systems, methods, and devices for predicting inventory and trends.

In some embodiments, a dynamic canvas processing controller comprises a third party website interface configured to receive user inputted area data from a third party website utilized by a user; an image database configured to store electronic images; a canvas dimension database configured to store area data relating to dimensions of canvases for areas; a canvas processing engine configured to access the canvas dimension database to obtain dimension data based on the user inputted area data, and configured to generate a virtual canvas comprising a canvas size based on the dimension data; an image processing engine configured to cause display to the user the virtual canvas, the virtual canvas configured to allow the user to generate an image in the virtual canvas; a storing engine configured to receive instructions from the user to electronically store the image in the virtual canvas into the image database; the third party website interface configured to transmit the image in the virtual canvas to the third party website to display the image to the user through the third party website; and one or more computers configured to operate the dynamic canvas processing controller, wherein the one or more computers comprises a computer processor and an electronic storage medium.

In some embodiments, the areas are surface areas on promotional products. In some embodiments, the areas are portions of websites. In some embodiments, the areas are portions of online marketing campaigns.

In certain embodiments, a dynamic canvas processing controller comprises a canvas dimension database interface configured for accessing a database configured to store area data relating to dimensions of canvases for editable areas; a canvas processing engine configured to access through the canvas dimension database interface the database to obtain area data based on canvas data corresponding to a user selected editable canvas, and configured to generate, based on the obtained area data, a virtual canvas comprising a canvas size having dimensions corresponding to the user selected editable canvas; an image processing engine configured to cause display to the user the virtual canvas, the virtual canvas configured to allow the user to generate an image in the virtual canvas; a storing engine configured to receive instructions from the user to electronically store the image in the virtual canvas into an image database; a display engine configured to cause display to the user the image in the context of a third party website; and one or more computers configured to operate the dynamic canvas processing controller, wherein the one or more computers comprises a computer processor and an electronic storage medium.

In some embodiments, the editable areas are surface areas on promotional products. In some embodiments, the editable areas are portions of websites. In some embodiments, the editable areas are portions of online marketing campaigns.

In some embodiments, a dynamic canvas processing controller comprises a third party website interface configured to receive a user selected item from a third party website utilized by a user; an image database configured to store electronic images; a items specifications database configured to store item data relating to rotatable image views of items; a canvas processing engine configured to access the items specifications database to obtain item data based on the user selected item, and the canvas processing engine configured to generate a virtual canvas comprising a canvas size based on the item data; an image processing engine configured to cause display to the user the virtual canvas, the virtual canvas configured to allow the user to generate an image in the virtual canvas; a storing engine configured to receive instructions from the user to electronically store the image in the virtual canvas into the image database; the third party website interface configured to transmit rotatable image views of the item to the third party website to display the item to the user through the third party website, the transmitted rotatable image views of the item comprising the image in the virtual canvas, the image positioned on the item; and one or more computers configured to operate the dynamic canvas processing controller, wherein the one or more computers comprises a computer processor and an electronic storage medium.

In some embodiments, the item is a promotional product.

In certain embodiments, a predictive inventory system comprises a third party website interface configured to receive a user selected item from a third party website utilized by a user; a supplier database configured to store supplier pricing data and inventory data for a first supplier and a second supplier, the supplier pricing data and the inventory data corresponding to the user selected item; a decorator database configured to store decorator pricing data for a first decorator and a second decorator, the decorator pricing data corresponding to processing the user selected item; a prediction engine configured to determine based on the supplier pricing data and the decorator pricing data for the user selected item that the user will select the first supplier, over the second supplier, in combination with either the first or second decorator; a notification controller configured to generate a first electronic notification to the first supplier that the user will likely select the first supplier and to increase inventory of the user selected item based the inventory data of the first supplier; and one or more computers configured to operate the predictive inventory system, wherein the one or more computers comprises a computer processor and an electronic storage medium.

In some embodiments, the notification controller is configured to generate a second electronic notification to the first supplier that the user selected item comprises an upward trending popularity level based on tracking received user selected items from a plurality of third party websites. In some embodiments, the notification controller is configured to generate a second electronic notification to the first decorator that the user will likely select the first decorator and to increase inventory of materials for decorating the user selected item.

In some embodiments, a single invoice generation system comprises a third party website interface configured to receive from a third party website a user selected item, a number of ordered user selected items from a supplier, and a supplier invoice amount for the number of ordered user selected items, the third party website utilized by a user; a decorator database configured to store decorator pricing data corresponding to the user selected item for one or more decorators; the third party website interface configured to transmit to the third party website the decorator pricing data corresponding to the user selected item for the one or more decorators; the third party website interface configured to receive user selected decorator from the third party website; a decorator interface configured to generate an electronic notification to the user selected decorator an order to decorate one or more of the user selected item; the decorator interface configured to receive an decorator invoice number and a decorator invoice amount from the user selected decorator, the decorator invoice number corresponding to the order; an invoice generation controller configured to generate a single invoice comprising a total invoice amount and a supplier invoice number, the total invoice amount comprising a summation of the supplier invoice amount for the number of ordered user selected items and the decorator invoice amount; the third party website interface configured to transmit the single invoice to the third party website; and one or more computers configured to operate the predictive inventory system, wherein the one or more computers comprises a computer processor and an electronic storage medium.

In some embodiments, the electronic notification comprises the decorator pricing data corresponding to the user selected decorator, and the decorator interface receiving of the decorator invoice number constitutes verification of the decorator pricing data. In some embodiments, the single invoice generation system comprises a payment processing controller configured to receive payment information data through the third party website interface, the payment processing controller configured to process the payment information data to obtain payment for the total invoice amount. In some embodiments, the payment processing controller is configured to cause payment of the supplier invoice amount to the supplier and to cause payment of the decorator invoice amount to the user selected decorator. In some embodiments, the decorator interface is configured to store the decorator invoice amount in the decorator database based on determining that the decorator pricing data deviates from the decorator invoice amount by a predetermined percentage.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

BRIEF DESCRIPTION OF THE DRAWINGS

The foregoing and other features, aspects and advantages of the embodiments of the invention are described in detail below with reference to the drawings of various embodiments, which are intended to illustrate and not to limit the invention. The drawings comprise the following figures in which:

Figure 17:
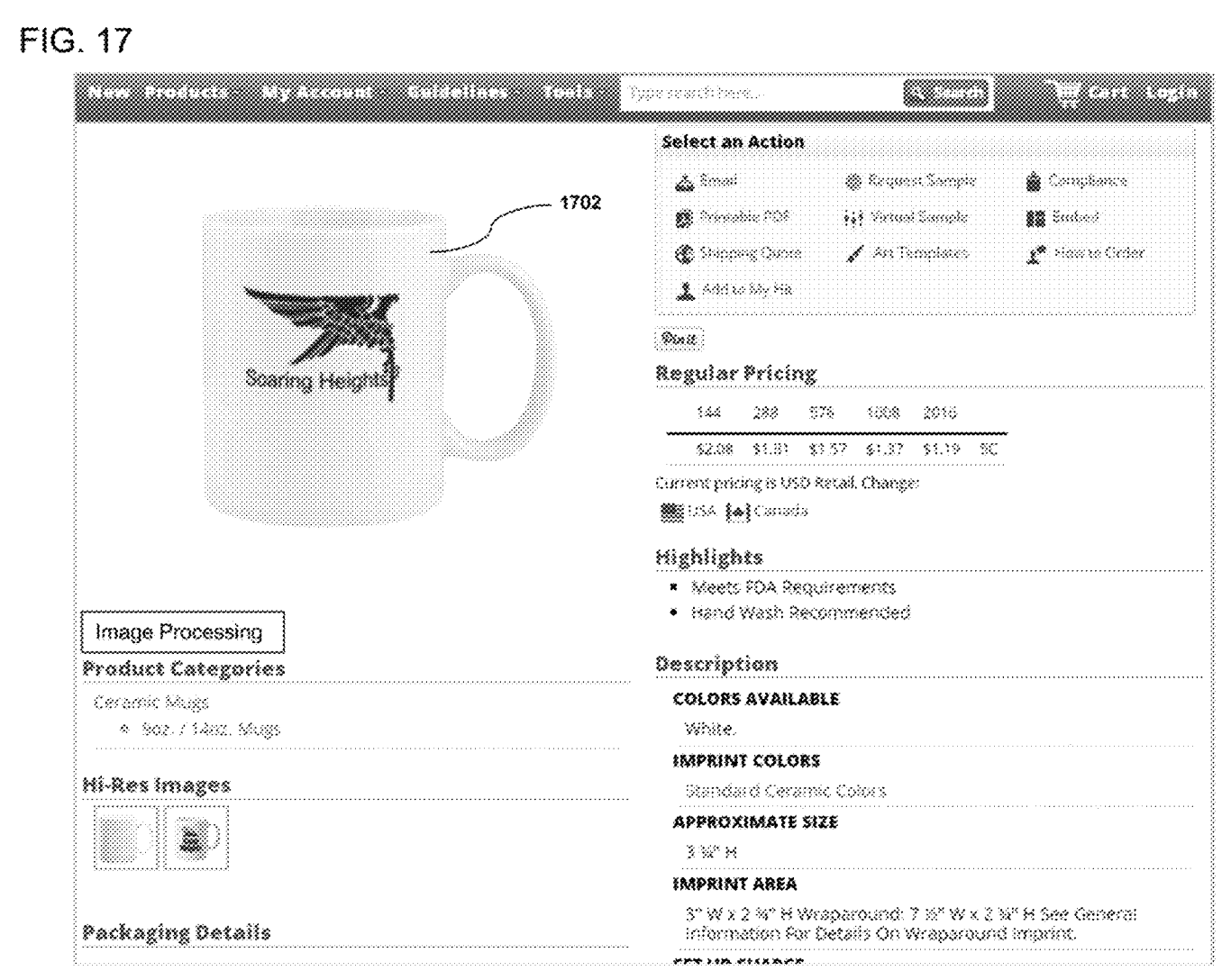

FIG. 17 illustrates the supplier website of FIG. 14, wherein the supplier website comprises a virtual product sample having the image generated from the image processing utility.

DESCRIPTION OF THE EMBODIMENTS

Figure 1:
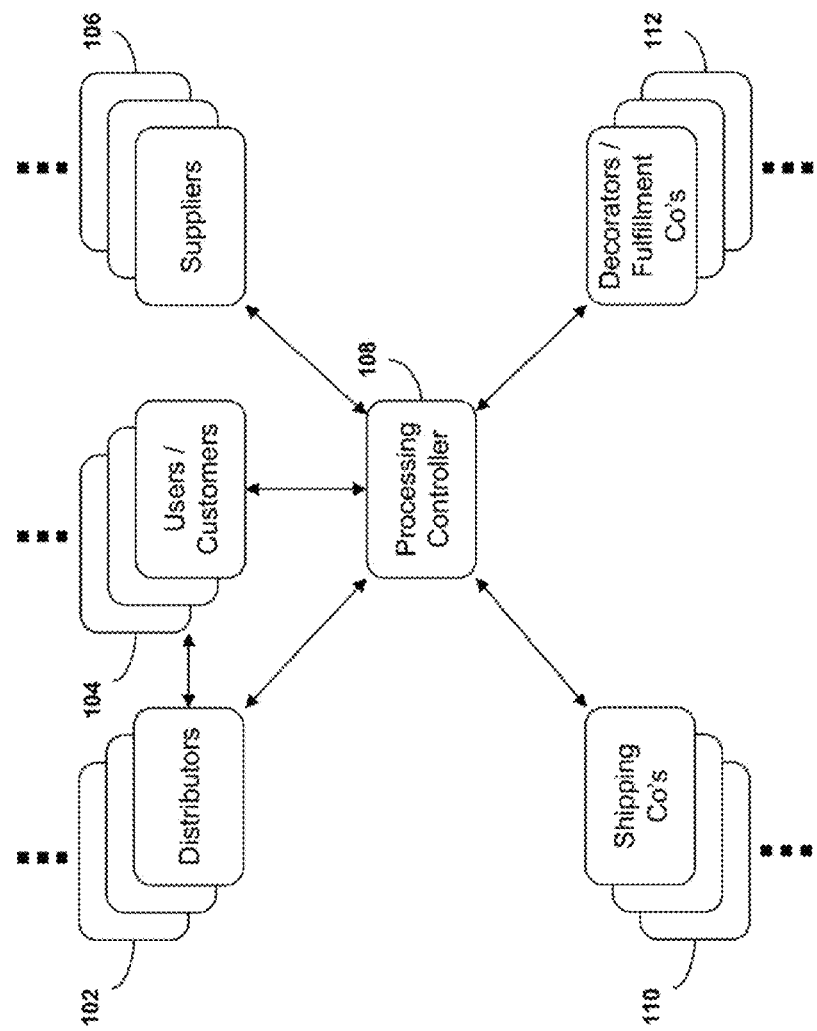
FIG. 1 is an embodiment of a schematic diagram illustrating business relationships between a processing controller and various other actors.

Although several embodiments, examples and illustrations are disclosed below, it will be understood by those of ordinary skill in the art that the inventions described herein extend beyond the specifically disclosed embodiments, examples, and illustrations, and include other uses of the inventions and obvious modifications and equivalents thereof. Embodiments of the inventions are described with reference to the accompanying figures, wherein like numerals refer to like elements throughout. The terminology used in the description presented herein is not intended to be interpreted in any limiting or restrictive manner simply because it is being used in conjunction with a detailed description of certain specific embodiments of the inventions. In addition, embodiments of the inventions can comprise several novel features and no single feature is solely responsible for its desirable attributes or is essential to practicing the inventions herein described.

The terms "marketing products" and "promotional products" as used herein are broad interchangeable terms, and unless otherwise indicated, the terms can include within their meanings, without limitation, any sort of promotional products, for example, pens, pencils, mouse pads, computer mouses, flashlights, apparel, headwear, footwear, toys, magnets, notepads, cups, bottles, bags, and the like.

The disclosure herein provides methods, systems, and devices for managing, tracking, and facilitating the ordering and procurement of promotional products. Additionally, the disclosure herein provides methods, systems, and devices for aggregating, managing, and tracking promotional product procurement data in order to allow for the data mining of such information. The disclosure herein provides methods, systems, and devices for enabling the generation of a virtual canvas for creating images sized for editable areas of a promotional product, website, brochure, banner, or the like. The disclosure herein provides methods, systems, and devices for enabling the generation of a virtual canvas for creating a rotatable image of a promotional product having positioned on the promotional product a user defined image. The disclosure herein provides methods, systems, and devices for enabling the generation of a single invoice comprising an invoice amount from a supplier and an invoice amount from a third party decorator.

Specifically, the disclosure herein provides methods, systems, and devices for aggregating, managing, and tracking promotional product procurement data in order to allow for the data mining of such information. Such data mining can enable the systems disclosed herein to predict inventory requirements by suppliers, predict which suppliers and/or decorators will be selected for a particular project, predict the time necessary for an order to be fulfilled by a particular supplier and/or decorator, predict which promotional products are trendy or will be trendy, generate a probability that a particular price estimate will be accepted by a particular distributor or user, or the like.

With the development of new technologies and various manufacturing techniques, it is now possible for companies to purchase a variety of promotional goods with their logo and/or name on such items. Companies find such promotional goods to be beneficial in maintaining brand recognition by their targeted customers. Accordingly, companies are generally always looking for novel and interesting promotional products to provide to their target audience. New and novel promotional goods are believed to improve retention of the company's name in the minds of the targeted customers, and name retention can lead to increased sales for a company.

Generally, the process for procuring such promotional goods requires that a company purchase the raw promotional products from a supplier. Such raw promotional products generally do not have a particular logo or company name imprinted on the product, but rather will have a space or an area on the promotional product in which a logo or company name can be positioned. In general, suppliers are companies that warehouse large volumes of promotional products of varying kind. Such promotional products stored in a warehouse by suppliers are then made available to companies and/or distributors that are engaged and/or employed by companies looking to purchase promotional products.

After the promotional products have been purchased from a supplier, the promotional products must be shipped to a third-party decorator. In many cases, the third-party decorator will take the raw promotional goods received from the supplier and apply or position a company's logo and/or name on the raw promotional products. For example, the decorator can utilize a silk-screening painting process to apply the company logo and/or name. As another example, the decorator can utilize various sewing and/or embroidering techniques to apply the company's logo and/or name to the raw promotional products. Other decorators or third party service providers are possible.

In general, a decorator does not generally store and/or warehouse large quantities of various sorts of promotional products. Rather, in general, decorators or other similar third party service providers are primarily in the business of taking in raw promotional products for a specific project and applying a particular company logo and/or company name to the received raw promotional products. In general, suppliers and decorators do not engage in the same line of business. In other words, suppliers generally only warehouse raw promotional products, and decorators generally only apply a company's logo and/or name to raw promotional products.

In this process for procuring promotional products, a company seeking to acquire promotional products will generally utilize the services of a distributor in order to obtain such products. Generally, such distributors do not warehouse or retain large quantities of raw promotional products and such distributors generally do not apply a company's logo or name to raw promotional products. Rather, a distributor merely receives an order from a company for a particular promotional product type and then hires a supplier to supply the raw promotional goods and will hire a decorator in order to have the company's logo and/or name applied to the raw promotional goods. In some instances, a company will not engage a distributor but rather will engage directly a supplier and a distributor in order to procure promotional products.

In either instance, the company and/or the distributor will receive two invoices for the purchase of the one particular promotional product type. Specifically, the company and/or distributor will receive a first invoice from the supplier for the purchase of the raw promotional products. The company and/or distributor will receive a second invoice from the decorator to cover the cost of applying and/or positioning the company's logo and/or name to the raw promotional products. Oftentimes, the receipt of two invoices for a single promotional product is confusing for a company. Generally, the position of the company is that the company has ordered a single promotional product type and therefore should only receive one invoice for this one product type. Accordingly, it would be advantageous to configure a system to generate a single invoice that can be presented to the company and/or distributor, wherein the single invoice can total the charges invoiced by both the supplier and the decorator.

Additionally, it can also be advantageous for the system to be configured to track and monitor the progress for procuring the promotional products from the supplier and the decorator. Currently, in order to track the procurement process, a distributor and/or a company would have to contact separately the supplier and/or the decorator in order to obtain a status and/or progress report. Therefore, it would be advantageous for a system to be configured to automatically and dynamically obtain status and/or progress data and information regarding the procurement of particular promotional products.

An additional challenge in the promotional product procurement process is the ability for suppliers and/or decorators to predict the amount of inventory to keep on hand and/or the amount of supplies that should be stored in order to fulfill orders by customers. Generally, suppliers warehouse a plurality of promotional products not knowing which products will be hot sellers and which products will not appeal to customers. Further, suppliers must keep large quantities of each of the various types of promotional products in order to satisfy the immediate demand of customers. The acquisition and storage of such large quantities of various types of promotional products can be quite costly and time-consuming for suppliers. Additionally, suppliers generally cannot predict what promotional products will experience a particularly popular trend and which products will immediately fall out of favor.

Accordingly, it can be advantageous for a system to be configured to dynamically and automatically predict the amount of inventory of particular types of promotional products that a particular supplier should warehouse. Further, it can be advantageous for a computer to be configured to predict what types of promotional products, for example color, product type, product size, product configuration, and the like, will be particularly popular during a particular period of time. Similarly, for decorators it can be advantageous for the system to be configured to predict whether a particular decorator will be selected for a particular project. Further, it can be advantageous for a computer system to be configured to predict the amount of supplies that a decorator should keep on hand in order to satisfy a customer's need for embroidering or painting a company logo and/or name onto raw promotional products.

To address the foregoing issues, there is disclosed herein various embodiments that solve and/or address the issues raised above. In an embodiment, the system is configured to display a catalog of available promotional products to a distributor and/or customer. The system can be configured to allow the distributor and/or customer to select a particular promotional product for purchase. In an embodiment, the system can be configured to allow the distributor and/or customer to upload a customer logo and/or customer name for positioning on the promotional product. In an embodiment, the system can be configured to display various options for supplying the promotional product to the distributor and/or customer. For example, the system can be configured to display a plurality of suppliers that can supply the raw promotional product to the distributor and/or customer.

Further, the system can be configured to analyze the uploaded logo and/or company name to determine appropriate and available decorators for positioning or adhering the company logo and/or name to the raw promotional product. In addition to providing a plurality of suppliers and/or decorators, the system can be configured to dynamically generate cost estimates for performing the client's desired work. The system can automatically and dynamically provide an estimate for the work of particular suppliers and/or the decorators based on pricing data previously provided by the plurality of suppliers and the plurality of decorators. For example, the system can be configured to generate a matrix of suppliers and/or decorators and the cost and timeline for producing/fulfilling the final product.

By displaying the various available suppliers and decorators along with price estimates for each to supply the distributor and/or customer with the necessary goods and/or services, the system can be configured to receive from the distributor and/or customer a selection of a supplier and/or a decorator. The system can be configured to also receive from the distributor and/or customer that a single invoice should be generated for both the supplier and the decorator.

In an embodiment, the system can be configured to generate for the distributor and/or customer a single invoice that includes the estimated charges for the supplier to prepare a single invoice that includes the cost of the supplier and the decorator. In an embodiment, the single invoice can be generated on the supplier's letterhead such that the distributor and/or customer pays the supplier the full amount of fees. Subsequently, the supplier forwards payment to the decorator for services provided and rendered by the decorator. The advantages of a single invoice are numerous. For example, the distributor and/or customer only receives a single invoice and need not prepare several different checks for various venders. It is also advantageous for the supplier because the supplier can better address the needs of his distributors and customers. Further, the supplier can act as a one-stop shop for the needs of the distributor and/or customer. Specifically, the supplier can appear to be in the decorator business without having to actually start a decorator operation.

In an embodiment, the single invoice can be produced on the decorator's letterhead whereby the initial payment is made to the decorator. The decorator thereafter can pay the supplier the necessary fees to cover the expense of the purchase of raw promotional goods selected by the distributor and/or customer. In an embodiment, the payment for the single invoice is received and processed by a third party service provider. The third party service provider can thereafter pay the supplier and the decorator the appropriate fees for the products and services provided by each.

In an embodiment, the system can be configured to generate additional purchase orders and/or work orders based on the single invoice that was generated for the distributor and/or customer. In an embodiment, the system can be configured to send the supplier a purchase order for the raw promotional product selected by the distributor and/or customer. In an embodiment, the system can be configured to generate and transmit to the decorator a work order for the services selected by the distributor and/or customer. Based on purchase orders and work orders, the supplier and/or the decorator can proceed with fulfilling the orders.

In an embodiment, the system can be configured to store in an electronic database the work order and/or the purchase order such that data mining analytics can be performed on such data. In an embodiment, the system can be configured to store data relating to a particular distributor and/or customer and how that particular distributor and/or customer selected a particular supplier and/or decorator. This data can be utilized by the system in order to predict which supplier and/or decorator the distributor and/or customer is likely to select. In an embodiment, the system can be configured to store in an electronic database data and information regarding a supplier's past delivery dates, and other dates relating to the fulfillment of orders and/or the completion of services. The system can be configured to use such historical data to determine whether a distributor and/or customer is likely to select a particular supplier and/or decorator.

In some embodiments, a system can be configured to mine data and/or to analyze various factors to determine why a specific supplier and/or distributor would be chosen for a particular order or project. In some embodiments, the system can be configured to analyze various factors such as a size of an order, a size of past orders, average order size, statistical information relating to past orders, numbers of different items in order, and various other historical factors relating to past orders. In some embodiments, the system can be configured to calculate a probability that a user will select a specific distributor or supplier based on a potential change in the situation. For example, the system can be configured to indicate to a distributor or supplier a suggested change to, for example, the distributor or supplier's markup, price, delivery or lead time, manufacturing capability, and/or the like to increase that distributor or supplier's chances of the user selecting that distributor or supplier.

In some embodiments, the system can be configured to generate and display a graphical indicator indicating chances of conversion of any particular order based on this data mining. For example, the system can be configured to generate an image of a slider that slides to, for example, the left and right to indicate a decrease or increase in probability of conversion based on real time changes or potential changes the distributor or supplier is making to its markup, price, capability, shipping time, and/or the like. In some embodiments, the system can be configured to operate in the opposite manner. For example, the system can be configured to enable a distributor or supplier to adjust the slider or to otherwise indicate to the system a desired probability of conversion, and the system can be configured to then calculate and propose to the distributor or supplier what changes the distributor or supplier should make to its markup, price, capabilities, shipping time, lead time, and/or the like to match that desired probability of conversion. In some embodiments, the system can be configured to automatically update one or more of these factors without requiring direct approval by the distributor or supplier based on a desired probability of conversion. Such features can be advantageous to, among other things, enable a distributor or supplier to increase its chances of conversion, meaning a user selects that distributor or supplier for an order.

In some embodiments, the system can be configured to analyze various factors that may be specific to certain distributors and/or suppliers. For example, in analyzing factors to determine a probability of conversion and to suggest changes in one or more factors to increase a probability of conversion, the suggestions may be different for different distributors and suppliers. For example, the system may be configured to analyze historical information and determine that, all other factors being equal, one distributor would be more likely to receive a specific order than a second distributor. Accordingly, the system may determine or estimate that the second distributor would need to cut its margin and/or adjust one or more other factors to a greater extent than the first distributor to equalize the probability or chance of a user selecting either of those two distributors. Such functionality can be advantageous to, for example, help enable a newer distributor or supplier that is not yet established in the industry to increase its chances of acquiring orders. On the other hand, such functionality can also be advantageous to, for example, enable a well-established supplier to price its items higher than other suppliers while still maintaining a higher probability of conversion. In some embodiments, the system can be configured to take into account and/or calculate elasticity of price. The system can be configured to take into account elasticity of price in data mining and generating probability of conversion estimates and/or recommendations to distributors and/or suppliers.

In some embodiments, a system as disclosed herein can be configured to analyze and/or mine data in real-time or substantially in real time. Further, the system can be configured to generate alerts for various users, distributors and/or suppliers of the system. For example, the system can be configured to alert the user or customer when a distributor or supplier has made a change, such as a price drop, lead time drop, and/or the like, that may interest that user or customer and/or that the system determines may increase the likelihood that that user or customer may select that distributor or supplier. Such an alert may be configured to be sent to, for example, a user or customer's email address, cellular telephone as a text message, and/or the like. In another example, the system can be configured to alert a distributor or supplier when, for example, a user or customer is interested in placing an order for items that distributor or supplier is potentially capable of providing. In some embodiments, such an alert may include data regarding what that distributor or supplier could potentially do to increase its chances of conversion of that order. For example, the message may indicate to a supplier that a user is interested in ordering 1000 units of a specific item, and that if the supplier sets its price at two dollars per item and a lead time of two weeks, there is a 75% chance that supplier will get the order. It should be noted that these examples, as with other examples disclosed herein, are non-limiting examples that are intended to illustrate particular capabilities of a system as disclosed herein, but are not intended to limit the disclosure.

Additionally, the disclosure herein provides methods, systems, and devices for managing, tracking, editing, sharing, and storing electronic images for use on promotional products, or on any type of third-party website or mobile application, such as Facebook®, WordPress®, Instagram®, social networking website or system, blogs, ConstantContact®, or any other similar system or platform wherein a user has the need or desire to place an image in. The systems disclosed herein can be advantageous to users and/or customers that need to create, edit or use a particular image on multiple promotional products, or within any type of third-party website or mobile application that allows the upload of graphics or images or the like.

For example, a user or customer may want to purchase a particular promotional product. The user will typically go to the website of the promotional product supplier. At the website, the user will select the promotional product that is desired. Typically, the user must then use the image editing tool provided on the website of the supplier. Often, this image editing tool will only allow you to upload images. In other instances, the image editing tool will allow a user to select an image from a database offered on the supplier's website. In other instances, the image editing tool will allow a user to edit an image. Generally, these image editing tools that are currently available on supplier websites do not allow a user to save a copy of the image they created to the account for future use with an alternative provider. It can be advantageous for the user to be able to access the image for future use at other product supplier websites. In many instances, these image editing tools do not allow for the user to download high resolution files of the edited image. It can be advantageous for the user to be able to download a high resolution image such that the user can use the image in the future or keep a copy of the file for the user's records. Often these image editing tools do not allow the user to utilize the edited image on another supplier's website. It can be quite advantageous for the user to be able to use the edited image on multiple supplier websites in order to save the user time in having to re-upload or re-edit a previously edited image.

Alternatively, the user must typically use an image editing software program, such as Photoshop, that is running on your local computer in order to edit and create an image. This process requires that a user is able to access such an imaging editing software and/or that the user knows how to use all the features of such an image editing software program. For example, the user needs to know how to set up the appropriate size canvas in the image editing software program in order to have the image appropriately displayed on a promotional product. After an image has been generated using the image editing software program, the user must then save the file in the correct format and/or with the correct size canvas, and then upload the image to supplier's website. These numerous steps, and as well as other steps, can present challenges to a user or customer when purchasing a promotional product, or when a user simply wants to upload an edited image to a website.

To address the foregoing issues, among others, there is disclosed herein various embodiments of a system for enabling an image editing tool to be embedded in multiple supplier websites (or embedded in any other type of third-party website or mobile application) using an application programming interface (API). One of ordinary skill in the art will appreciate and understand that any of the systems, methods, and features disclosed herein can be used in conjunction with or be embedded in not only supplier or distributor websites, but also with or in any other type of third-party website or mobile application.

In an embodiment, a supplier website can simply include HTML code and/or other software code into the supplier's website which will enable an image editing software tool button to be displayed on the supplier's website. In an embodiment, the image processing tool button can be displayed along a product sample offered by the supplier on the website. The user or customer can select the image processing tool button to activate the image processing utility. The image processing utility can enable a user to upload an image from the user's computer. In an embodiment, the system can enable the user to select an image from an image database. In an embodiment, the selected image can be an image previously generated by the user. In an embodiment, the image can be a stock image available in the system. In an embodiment, the system can be configured to allow the user to manipulate, edit, or otherwise utilize the image on a virtual canvas generated by the system.

In an embodiment, the system can be configured to automatically generate a virtual canvas that is particularly sized for the promotional product selected by the user. For example, the user can access the website of the supplier in order to peruse the available promotional products that are being offered by the supplier. The user can then select a particular promotional product for ordering. In order to customize the promotional product, the user can then select the image processing tool button which can be configured to call the system to generate and display the image processing utility. The image processing utility can be configured to access a products database. In an embodiment, the database can be provided by the supplier, a third party, or can be part of the system. In an embodiment, the database can be configured to comprise canvas dimension data for the particular promotional products that are being offered by the supplier.

The canvas dimension data can be configured to be utilized by the system to generate a virtual canvas for display to the user. The virtual canvas can be particularly sized for the promotional product selected by the user. In an embodiment, it is configured to prevent the user from positioning an image that is too big for the promotional product. In an embodiment, certain promotional products are configured to only allow for particular surface areas to comprise an image. All areas outside of the particular surface area may not be suitable for adhering and/or positioning an image to the promotional product. Accordingly, a virtual canvas can be utilized to ensure that the user can position the user selected image onto the promotional product properly.

In an embodiment, the system can be configured to allow the user to manipulate and edit the virtual canvas that has been generated for the particular promotional product. For example, the system can be configured to allow the user to insert an image onto the virtual canvas. In an embodiment, the system can be configured to allow the user to add text to the virtual canvas. In an embodiment, the system can be configured to allow the user to add other elements to the virtual canvas, such as lines, circles, triangles, or other shapes, colors, imaging effects, or the like. After the user is satisfied with the edited image on the virtual canvas, the user can select a save button.

The system can be configured to save the edited image in the image database. The system can be configured to save the edited image to a local computer hard drive or to an online storage facility. In an embodiment, the image database can be part of the system, a third party system, and/or part of the supplier's website system. In an embodiment, the system can also be configured to analyze the edited image and the canvas dimension data and the image data of the selected promotional product in order to dynamically generate in real time an image of the selected promotional product having the edited image positioned on the promotional product. In other words, the system can be configured to dynamically generate in real time a virtual sample of the promotional product selected by the user. In an embodiment, the system can be configured to transmit the image of the virtual product sample to the supplier website for display on the supplier's website.

In an embodiment, the system can be configured to transmit the electronic image of the virtual product sample to the supplier's website such that the electronic image can be embedded in the supplier's web page directed to the promotional product selected by the user. In an embodiment, the user can then finalize the order for purchasing the selected promotional product on the supplier's website.

In many instances, a user or customer may purchase multiple promotional products from various suppliers or distributors. In such instances, the user or customer may want to utilize the same image on other promotional products purchased from other suppliers or distributors. Accordingly, the system can be configured to enable the image processing tool button to appear on the websites of other suppliers or distributors. In an embodiment, other suppliers and/or distributors can insert HTML code and/or other software code to enable the supplier website to communicate over a network with the system disclosed herein. In an embodiment, the communications between the supplier website and the system can be accomplished through an application programming interface (API). With the image processing tool button available on multiple supplier websites, the user and/or customer can access other websites from other suppliers. After perusing the promotional products provided by other suppliers, the user can be configured to select a particular promotional product for ordering. In an embodiment, the website of the other supplier can be configured to allow the user to select the image processing tool button.

By selecting the image processing tool button, the system can be activated to display the image editing utility. In an embodiment, the system can be configured to access the canvas dimension data for the selected promotional product. As stated above, the canvas dimension data can be accessed from a database that is provided by the other supplier, by a third party, or by the system. In an embodiment, the system can be configured to generate a virtual canvas based on the canvas dimension data. In selecting a different promotional product from a different supplier, the system can be configured to generate a different sized virtual canvas from that of the virtual canvas generated for the first promotional product ordered by the user. For example, the new virtual canvas can be smaller, bigger or the same size as the previous virtual canvas. In an embodiment, the system can be configured to enable the user to manipulate the virtual canvas in order to insert an image into the virtual canvas.

In an embodiment, the system can be configured to allow the user to access the image database in order to select the previously edited image that was positioned on the previous promotional product that was provided by the first supplier. In other words, the system can be configured to enable the user to share and store previously edited images across multiple suppliers and/or distributors. This feature can be particularly advantageous for a user or customer in order to reduce the necessary time for recreating the same image on multiple supplier websites, wherein each supplier website has a different image editing tool. By enabling a common image editing system to be utilized across multiple supplier or distributor websites, the user also benefits from not having to relearn a new image editing tool for each supplier or distributor. In other words, the user need only be familiar with one look and feel of an image processing utility when purchasing promotional products from multiple suppliers and/or distributors.

In an embodiment, the system can be configured as an application service provider. For example, the system can be configured to run as a cloud service. As a cloud service, the websites of various suppliers and/or distributors can be configured to embed HTML code and/or other software code in the website of the supplier or distributor. The embedded HTML code and/or other software code can be configured to enable the website of the supplier or distributor to call the system that is provided as a cloud service. In other words, the supplier and/or distributor website is operated separately from the system for providing the image processing utility.

In an embodiment, the calling of the system by the website of the supplier and/or distributor can be made seamless. For example, when the user selects the image processing tool button, it does not appear to the user that the user has left the website of the supplier or distributor even though what is being displayed on the user's screen is the image processing utility screen that has been generated by the system which is separate from that of the website servers operated by the supplier and/or the distributor. This can be especially advantageous for the suppliers and/or distributors because the suppliers and distributors need not create, manage, and/or operate the image processing utility system. All that a supplier or distributor would need to do to utilize the image processing utility system would be to insert the necessary HTML code and/or other software code into the websites of the supplier or distributor.

In an embodiment, the system can be configured to display a login screen in order for a user or customer to access the image processing utility system. The user login information is necessary in order to ensure that the user has access to the user's previously edited and/or saved images that are stored in the image database. In an embodiment, the system can be configured to communicate with the supplier or distributor's website through an API in order to allow for automatic login of the user into the image processing utility system. In an embodiment, the system can be configured to utilize the login information that the user provided to the supplier or distributor website in order to grant access to the user to the user's saved or stored images in the image database.

In an embodiment, the system can be configured to generate an image file after the user has finalized and saved the image file using the image processing utility system. In an embodiment, the system can be configured to access the products database to dynamically determine the type of image file that the system should return or transmit to the supplier and/or distributor such that the supplier or distributor can position the image file on the customer selected promotional product. In many instances, a supplier and/or distributor will have a specific file type necessary for rendering the image onto the promotional product during the manufacturing process. Accordingly, it is important for the image file type to be suitable for the manufacturing process. In an embodiment, the system can be configured to dynamically determine the file type based on the promotional product type, and/or material of the promotional product, and/or surface finish of the promotional product, and/or the shape and/or curvature of the promotional product. In an embodiment, the system can be configured to dynamically determine the file type based on the supplier name or user/customer name, and/or historical use data. In an embodiment, the system can be configured to create an SVG file, or an AI file, or an EPX file, or a PDF file, or the like. In any embodiment, the system can be configured to allow the user to download a high resolution image of the file that was saved using the image processing utility system. In an embodiment, the system can enable the user to save the high resolution file onto a local computer for the user's reference and records.

In an embodiment, any of the features disclosed herein of the image processing utility system can be configured to be embedded in a social networking website, such as Facebook®, or a blog website, such as WordPress®, or the like. By enabling connectivity between a social networking site/blog website and the image processing utility system, the user or customer can upload previously edited and saved images that have been stored in the image database onto a social networking website/blog website. The user or customer can utilize the same images used on promotional products to also promote the user's goods and services on a social networking website/blog website. This can be particularly advantageous for a user in order to have a consistent logo, and look and feel across promotional products and various websites. In an embodiment, the social networking website and/or blog website can be configured to embed an image processing tool button next to each area of the website that can be customized by the user. For example, a blog website can be configured to comprise an area in the blog page for the user's image. In an embodiment, the blog website can be configured to embed an image processing tool button next to the area where the user can insert image to the blog page.

In an embodiment, the features disclosed herein of the image processing utility system can be configured to be embedded in a third-party website of any kind. For example, the image processing utilities can be configured to be embedded in a website of a florist shop. In this example, the florist shop website can comprise an editing tool button, similar to the image processing tool button disclosed above. In an embodiment, the editing tool button can be configured to allow a user to generate a personalized greeting card to be sent with the users selected flower arrangement. For example, the image processing utility system can be configured to allow the user to upload or utilize a previously stored image as a basis for a greeting card. In an embodiment, the image processing utility system can be configured to allow the user to insert a personalized greeting message into the customized card. The personalized greeting message can be inserted using any kind of stylized font. The foregoing features can be particularly advantageous for florist shops because typically cards are generated based on standardize greeting cards and messages that are inserted into the card in plain text based on user input. In an embodiment, the system can be configured to perform batch processing as may be necessary for sending out a plurality of customized cards based on a mailing list. For example, the system can be configured with an API or other interface that allows the user to upload a mailing list that may comprise one or more of the following: a listing of recipients, addresses for recipients, a personalized message for recipients, and the like. One of ordinary skill in the art will appreciate that the foregoing features can also be implemented in conjunction with other types of businesses in addition to florist shops.

In an embodiment, the features disclosed herein of the image processing utility system can be configured to be embedded in a marketing website, such as ConstantContact®. In general, marketing websites can allow users to generate online and email marketing campaigns. In an embodiment, the marketing website can comprise an editing tool button or an image processing tool button. In an embodiment, the tool button can be configured to allow a user to utilize the image processing utility system to create online marketing materials. For example, a user can select the editing tool button on the marketing website in order to generate an online marketing campaign using previously stored images. In an embodiment, the user can select the image processing tool button in order to create a new image for use in an online marketing campaign, and the user can utilize the image processing utility system to save the newly created image for future use on promotional products or in other websites.

In some embodiments, an image processing system is configured to know the image size requirements or constraints of a particular website, product, and/or the like. The system can be configured to use this known size to generate an appropriately sized virtual canvas for a user to create and/or edit an image for use with the website, product, and/or the like. In various embodiments, the system can be configured to determine the appropriate size of the virtual canvas in various ways. For example, the system may obtain the canvas size from a database of known size requirements. In another example, the system may be configured to obtain the required canvas size from code embedded in a webpage, with the coded being placed in the webpage's code for the specific purpose of informing the system of the appropriate canvas size. In yet another example, the system can be configured to dynamically analyze a product, website, and/or the like to determine an appropriate canvas size. For example, the system can be configured to analyze html code for a webpage to automatically determine the available space for an image. Such functionality may be particularly advantageous to enable the system to be utilized with webpages that have not been specifically designed to work with an image processing system as disclosed herein.

In some embodiments, the system can be configured to, once it has analyzed a webpage to determine an appropriate canvas size, store in a database data relating to that appropriate size such that other users requesting to generate artwork or an image for that or a related webpage can utilize the same virtual canvas size without requiring the system to analyze the webpage again. In some embodiments, the system is configured to periodically re-analyze one or more webpages to confirm that the stored virtual canvas size information is still accurate. For example, a website may alter one or more of its webpages, making any stored virtual canvas data obsolete. In some embodiments, the system can be configured to analyze a webpage and/or an artwork area to confirm or verify an appropriate canvas size, even if the webpage has data embedded within it intended to tell the system what the appropriate canvas size is. This can be advantageous because, for example, a website administrator may change a webpage in a way that affects the virtual canvas size, but the website administrator may forget to update the code intended to tell the image processing system what canvas size is appropriate.

In some embodiments, the system can be configured to enable a user to work with a virtual canvas that is bigger than an appropriate canvas area for the webpage, product, and/or the like where the artwork is intended to be used. The system can be configured to then crop and/or resize the artwork to the appropriate canvas size once the user has completed creating or making edits to the artwork. Such functionality can be advantageous to, for example, enable a single piece of artwork to be utilized on various webpages, products, items, and/or the like that each have different canvas sizes. In some embodiments, the system can be configured to store cropping and/or resizing data so that the system knows how an image or artwork should be cropped for each particular webpage, item, product, and/or the like.

In some embodiments, a system as disclosed herein can be configured to be a home or repository for all of a user's graphical content or artwork. For example, a system can be configured to store in a database various artwork items that can be used across a variety of webpages, websites, products, promotional items, and/or the like. In some embodiments, the system can be configured to store information relating to the canvas size requirements for each place where the artwork may be used, and to enable a user to automatically crop and/or resize a piece of artwork for a particular usage.

In some embodiments, an image processing system or image processing utility system as disclosed herein can be configured to enable users to create images or artwork for webpages or other items that are not specifically designed to work with the image processing system. For example, a webpage may enable a user to upload an image file, such as a JPEG, bitmap, and/or the like. However, that webpage may not be specifically configured to work with the image processing system. The image processing system may be configured to enable the user to generate artwork using the image processing system and then to manually upload that artwork or image file to the webpage using whatever means for uploading image files the website provides.

In some embodiments, an image processing system as disclosed herein can be configured to communicate with an order processing system. For example, an image processing system can be configured to enable a user to generate artwork and then preview that artwork on a virtual product sample. The system can be configured to enable the user to then place an order for that item. Once the user has indicated a desire to order that item, the image processing system can be configured to communicate to the order processing system an electronic link enabling the order processing system to access the artwork generated by the user. The order processing system can be configured to enable another user to perform any further edits required to the artwork before the artwork is placed on the physical product.

One benefit of such a system is that the original user, such as the customer purchasing a product with artwork applied on it, and a user of the order processing system, such as an employee of the company producing the actual product, can work off of the same artwork file. As an illustrative example, a customer may desire to order 100 ceramic mugs with a picture on the mugs. The user can access a website to place an order for those 100 mugs. In the process of placing the order, the website can enable the user to interact with an image processing system to create the artwork that comprises the picture. The user can position the picture, superimposed text over the picture, and make various other edits to the artwork. Once the user is happy with the artwork, the website can be configured to display the artwork on a virtual product sample, such that the user can see a rotating 360° virtual product sample representing the mug with the picture on it. Once the user selects to order this example, a link can be electronically sent to a supplier of the mugs that enables the supplier to access the artwork. The supplier may access the artwork and determine that the color of text the user included superimposed over the picture may not be the best color, and that the text may stand out better if the text were a different color. Accordingly, the supplier may directly work on the artwork to update the color. The mugs can then be produced with that artwork, and the updated artwork will be immediately accessible to the customer in case the customer wants to use that artwork for any other products.

In some embodiments, the system can be configured to store different versions of images. For example, in the mug example above, the system may be configured to store both the original version and the updated version with a different color of text. The system can be configured to track any changes made to the artwork and enable a user to roll back changes if he or she desires. In some embodiments, different versions of the artwork are stored in different files. In other embodiments, the system is configured to store a base artwork file, and to store tracked changes in a separate file or files.

FIG. 1 is an embodiment of a schematic diagram illustrating business relationships between a processing controller and various other actors. As illustrated, processing controller 108 can be configured to communicate with a plurality of distributors 102, a plurality of users and/or customers 104, and a plurality of suppliers 106, and a plurality of decorators/fulfillment companies 112, and a plurality of shipping companies 110.

Figure 2:
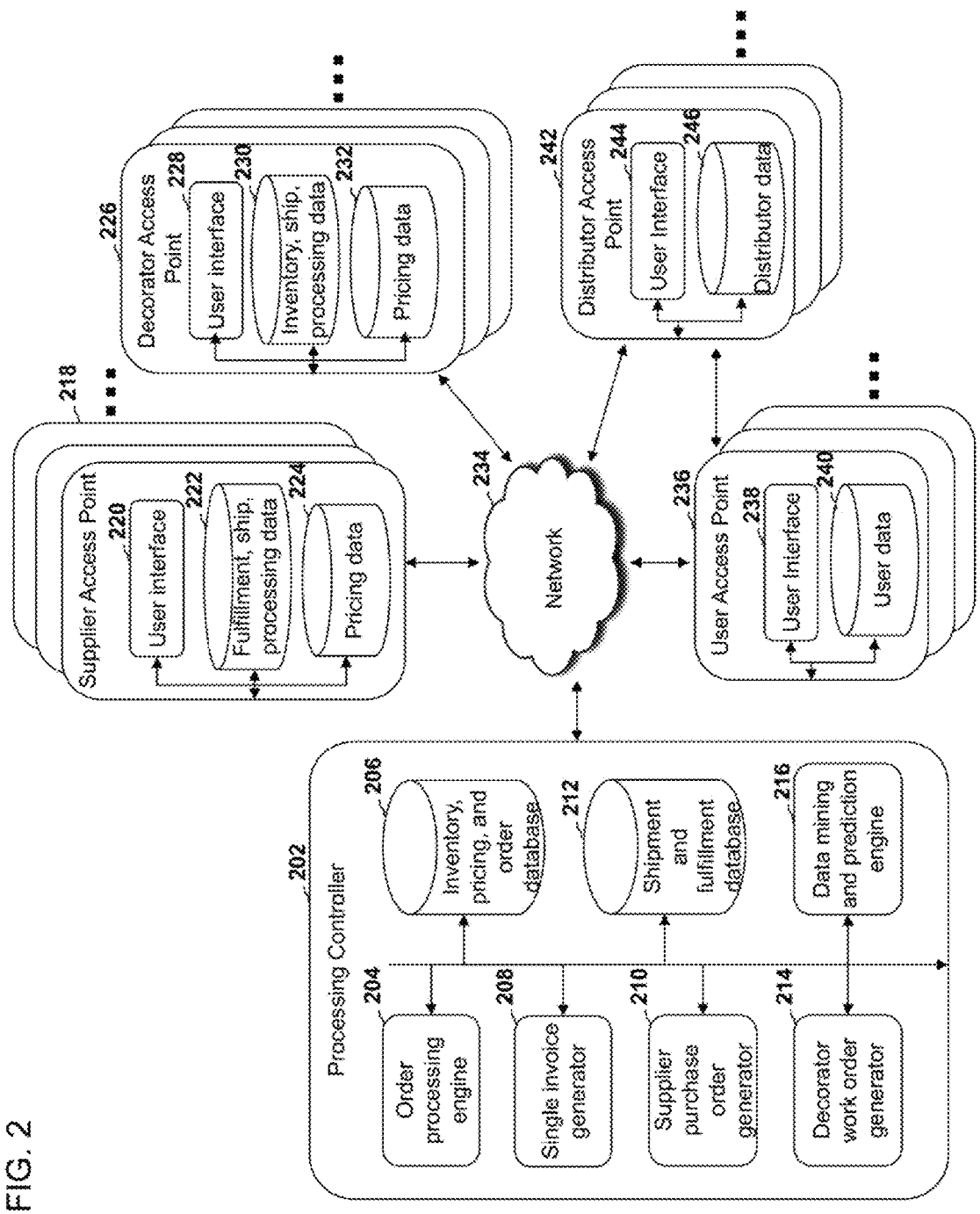
FIG. 2 is a block diagram depicting a high level overview of an embodiment of a processing controller connected to a plurality of systems.

FIG. 2 is a block diagram depicting a high level overview of an embodiment of a processing controller connected to a plurality of other systems. In an embodiment, processing controller 202 comprises a plurality of components. For example, processing controller 202 can comprise without limitation an order processing engine 204, a single invoice generator 208, a supplier purchase order generator 210, a decorator work order generator 214 and a data mining and prediction engine 216. In an embodiment, the processing controller 202 can be configured to comprise an inventory, pricing, and order database 206, and/or a shipment and fulfillment database 212.

As illustrated in FIG. 2, the processing controller 202 can be configured to be connected to a network 234. Through network 234, the processing controller 202 can communicate with a plurality of supplier access point 218. In an embodiment, the processing controller 202 can be configured to communicate with a plurality of decorator access points 226, and a plurality of distributor access points 242, and a plurality of user access points 236. In an embodiment, the supplier access point 218 can comprise a user interface 220, a fulfillment, ship, processing database 222, and a pricing database 224. In an embodiment, the decorator access point 226 can be configured to comprise a user interface 228, an inventory, ship, processing database 230, and a pricing database 232.

As depicted in FIG. 2, the distributor access point 242 can be configured to comprise a user interface 244 and a distributor database 246. The user access point 236 can be configured to comprise a user interface 238 and a user database 240.

Figure 3:
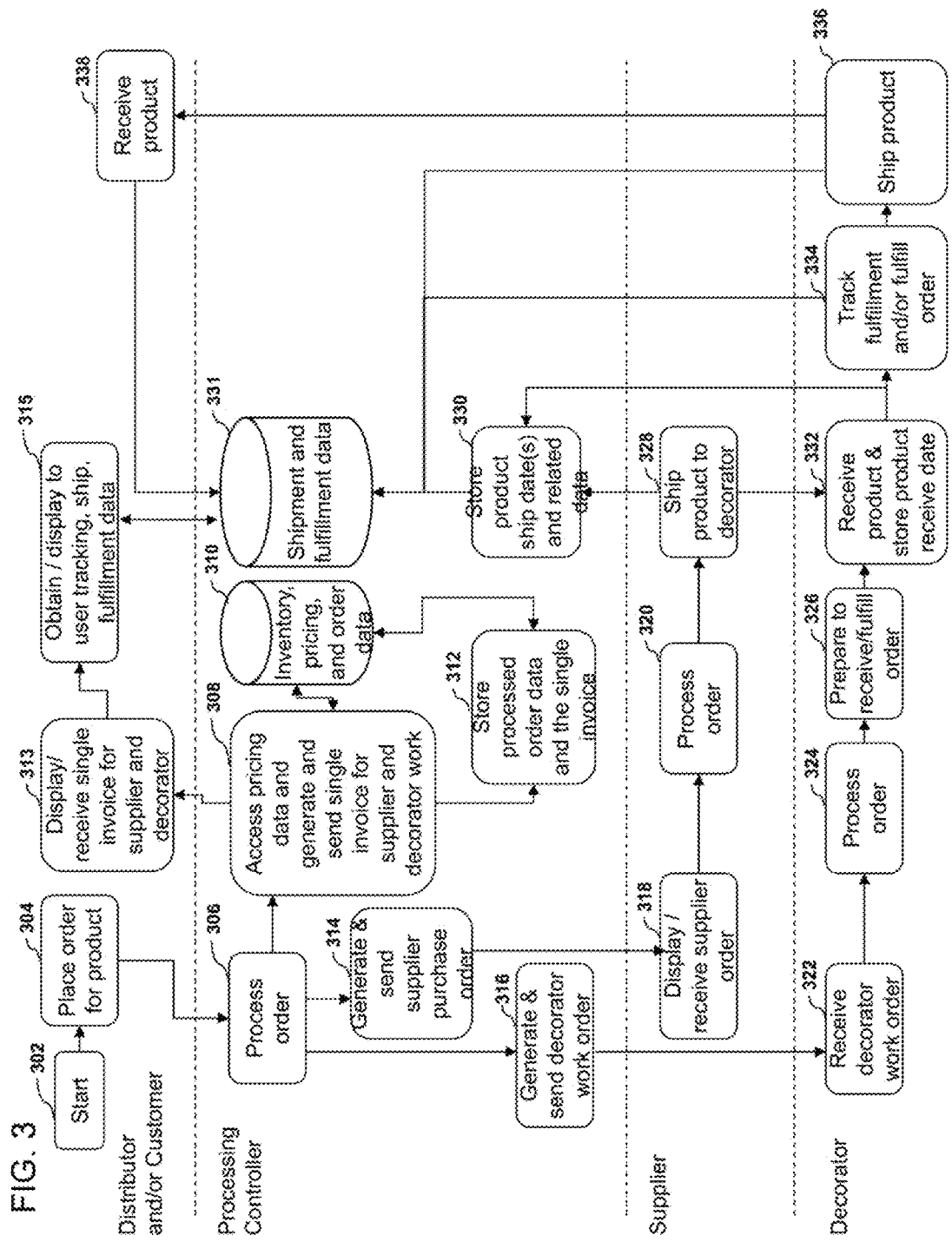
FIG. 3 is an embodiment of a process flow diagram for procuring promotional products through a processing controller.

FIG. 3 is an embodiment of a process flow diagram for procuring promotional products through a processing controller. In an embodiment, the process can start at block 302 where the system can be configured to allow a distributor and/or customer to place an order for a promotional product at block 304. At block 306, the system can be configured to process the order placed by the distributor and/or the customer. At block 308, the system can be configured to access pricing data and generate and send a single invoice for the supplier and the decorator by accessing pricing data stored in inventory, pricing, and order database 310. At block 313, the system can be configured to display to the distributor and/or the customer the single invoice for the supplier and the decorator. At block 312, the system can be configured to store the processed order data and the single invoice in the database 310.

As illustrated in FIG. 3, the system can be configured to generate and send supplier purchase order to the supplier. At block 316, the system can be configured to generate and send a decorator work order to the decorator based on the processed order. At block 318, the system can be configured to display the purchase order to the supplier. At block 320, the system can be configured to process the purchase order in order for the supplier to ship the product to the decorator at block 328. In an embodiment, the system can be configured to store the product ship date and related data at block 330 within shipment and fulfillment database 331.

At block 324, the system can be configured to process the work order received by the decorator. At block 326, the system can be configured to facilitate the decorator in preparing to receive and fulfill the order. At block 332, the system can be configured to track a receipt of the product from the supplier and store the product receipt date in database 331. In an embodiment, the system can be configured to track fulfillment and/or fulfill order progress at block 334 and store such data in database 331. At block 336, the system can be configured to facilitate the shipment of the completed product to the distributor and/or the customer such that the product can be received by the distributor and/or the customer at block 338. In an embodiment, data relating to product shipment and product receipt can be stored in database 331.

Figure 4:
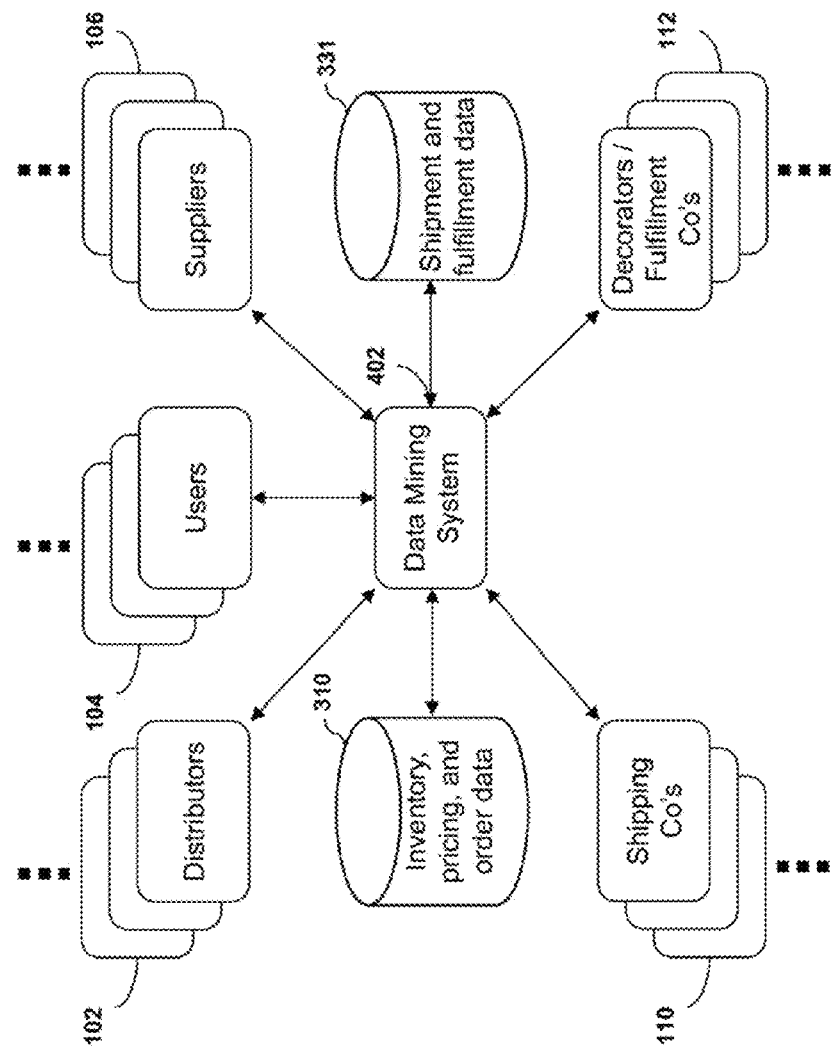
FIG. 4 is an embodiment of a schematic diagram illustrating business relationships between a data mining system and a plurality of actors.

FIG. 4 is an embodiment of a schematic diagram illustrating business relationships between a data mining system and a plurality of actors. In an embodiment the data mining system 402 can be configured to access data from an inventory, pricing, and order database 310 and/or access data from shipment and fulfillment database 331. In an embodiment, the data mining system 402 can be configured to connect to a plurality of distributors 102, a plurality of users 104, a plurality of suppliers 106, a plurality of decorators/fulfillment companies 112 and a plurality of shipping companies 110.

Figure 5:
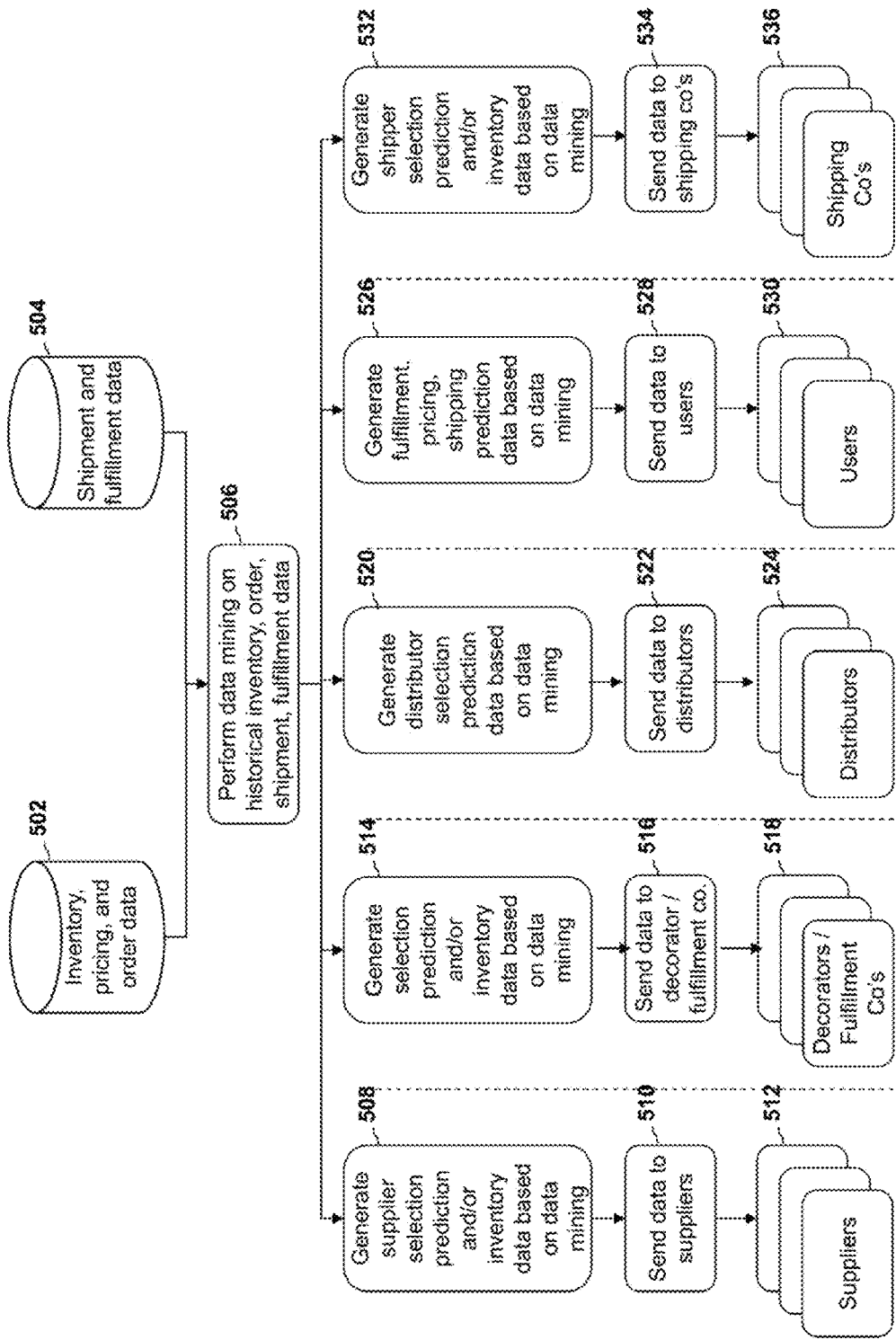
FIG. 5 is a flowchart depicting an embodiment of a process for data mining historical inventory, order, shipment and fulfillment data.

FIG. 5 is a flowchart depicting an embodiment of a process for data mining historical inventory, order, shipment, and fulfillment data. In an embodiment, the process can start at block 506 by performing data mining on historical inventory, order, shipment, fulfillment data by accessing an inventory, pricing, and order database 502 and/or a shipment and fulfillment database 504. At block 508, the system can be configured to generate supplier prediction and/or inventory data predictions based on the data mining. At block 510 the system can be configured to send such data to a plurality of suppliers 512.

At block 514, the system can be configured to generate selection prediction and/or inventory data predictions based on the data mining. At block 516, the system can be configured to send such data to a plurality of decorators/fulfillment companies 518. At block 520, the system can be configured to generate distributor selection prediction data based on the data mining. At block 522, the system can be configured to send such data to a plurality of distributors 524.

At block 526, the system can be configured to generate fulfillment, pricing, shipping prediction data based on the data mining. At block 528, the system can be configured to send such data to a plurality of users 530. At block 532, the system can be configured to generate shipper selection prediction data and/or inventory prediction data based on the data mining. At block 534, the system can be configured to send such data to a plurality of shipping companies 536.

Figure 6:
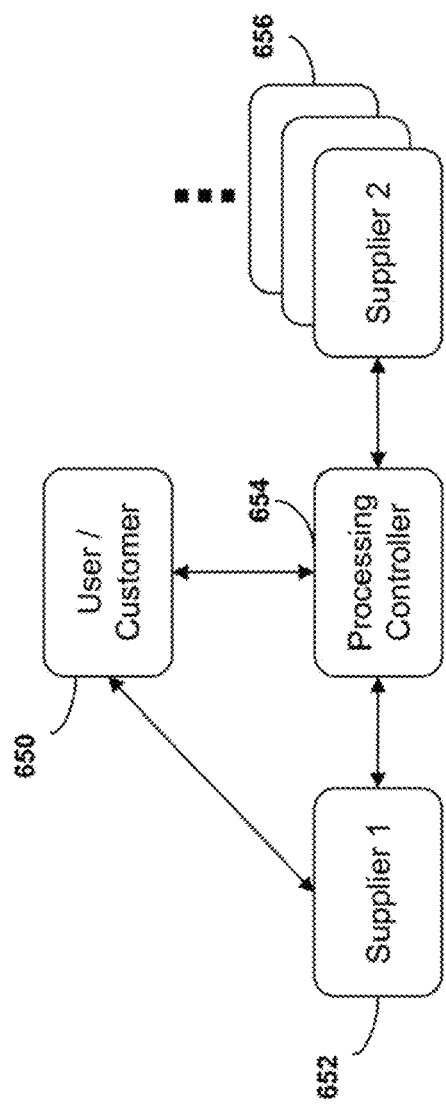
FIG. 6 is an embodiment of a schematic diagram illustrating business relationships between a processing controller and various other actors, such as suppliers and users/customers.

FIG. 6 is an embodiment of a schematic diagram illustrating business relationships between a processing controller and various other actors, such as suppliers and users/customers. As illustrated, one or more users/customers 650 can be in communication with supplier 1 652. As discussed above, the one or more users/customers 650 can visit the website of supplier 1 652 when attempting to purchase promotional products offered by supplier 1 652. As illustrated supplier 1 652 can be configured to communicate with the processing controller 654. As disclosed above, the supplier 1 652 website can be configured to comprise an image processing tool button for the user to select. The selection of the button by the user invokes the processing controller 654. In an embodiment, the processing controller 654 can be configured to display before the user 650 the image processing utility screen. Using the image processing utility screen, the user can position an image on a promotional product that is being offered by the supplier 1 652. As illustrated, the processing controller 654 can also be configured to communicate with a plurality of suppliers 656.

Figure 7:
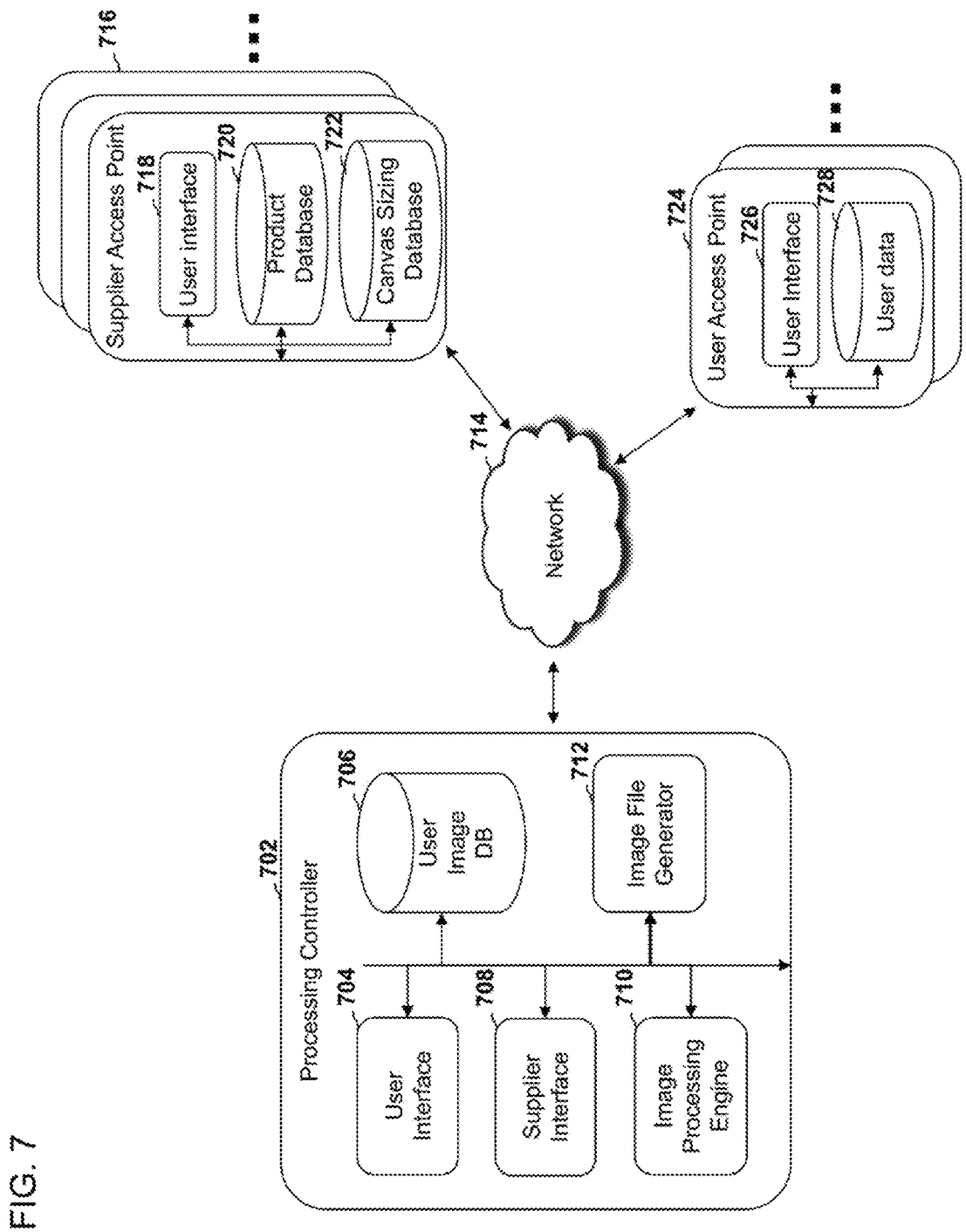
FIG. 7 is a block diagram depicting a high level overview of an embodiment of a processing controller connected to a plurality of systems.

FIG. 7 is a block diagram depicting a high level overview of an embodiment of a processing controller connected to a plurality of systems. In any embodiment the processing controller 702 comprises a plurality of components. For example, the processing controller 702 can comprise without limitation a user interface 704, a supplier interface 708, an image processing engine 710, a user image database 706, and an image file generator 712.

As illustrated in FIG. 2, the processing controller 702 can be configured to be connected to a network 714. Through the network 714, the processing controller can be configured to communicate with a plurality of supplier access points 716, and a plurality of user access points 724. In an embodiment, the supplier access point 716 can comprise a user interface 718, a product database 720, and a canvas sizing database 722. In an embodiment, the user access point 724 can comprise a user interface 726 and a user database 728.

In an embodiment, the user access point 724 can be configured to access the supplier access point 716 through network 714. For example, the user access point 724 can be a web browser acting as the user interface 726. The web browser on the user computer can interface with the user interface 718 of the supplier access point 716. In an embodiment, the user interface 718 can be a web server. The user can browse the various products offered by the supplier through the web server which can be configured to access the product database 720. Once the user selects a product for possible purchase, the user may then decide to add an image to the promotional product. In which case, the user can select the image processing tool button available on the web page of the supplier. The selecting of the image processing tool button allows for activation of the processing controller 702. In an embodiment, the user interface 704 can be the image processing tool button that is selected by the user. In an embodiment, the user can manipulate an image using the image processing engine 710 through interacting with the user interface 704. The user can also access images stored in the user image database 706 by interacting with the user interface 704. After finalizing an image to be appended to a promotional product the processing controller 702 can be configured to use the image file generator 712 to create an image file for transmission to the supplier access point 716 through the supplier interface 708. In an embodiment, the supplier interface 708 can also be used to interface with the canvas sizing database 722. The canvas sizing database 722 can comprise canvas dimension data for each particular product offered by the supplier. As disclosed above, the canvas dimension data can be used by the image processing engine 710 to create a virtual canvas for the user to manipulate and to create an image for appending to the promotional product.

Figure 8:
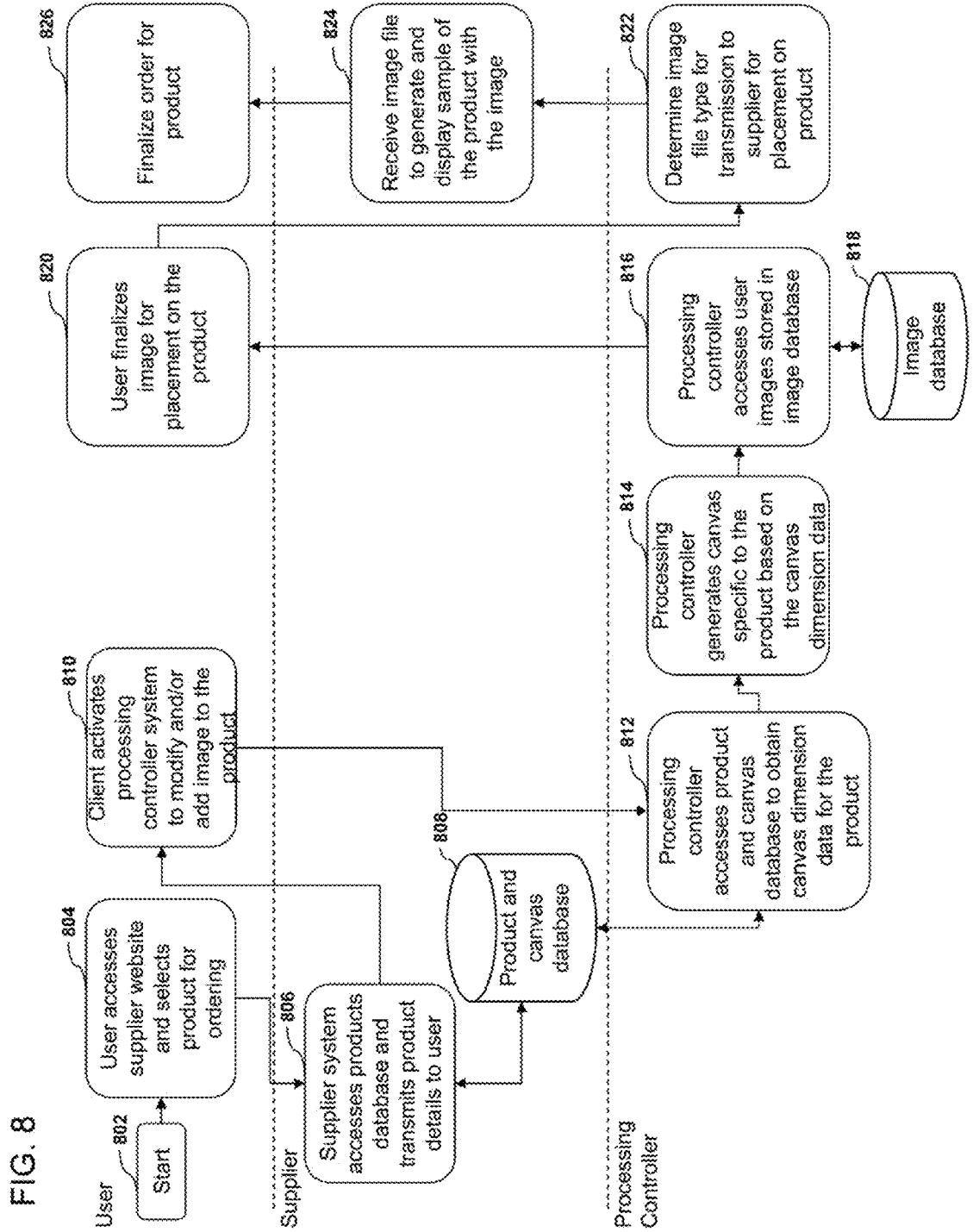
FIG. 8 is an embodiment of a process flow diagram for procuring promotional products through a processing controller.

FIG. 8 is an embodiment of a process flow diagram for procuring promotional products through a processing controller. In an embodiment, the process can start at block 802. At block 804, the system can be enabled to allow the user to access the supplier website and select a promotional product for ordering. At block 806, the supplier system can be configured to access the products database 808. In an embodiment, the supplier system can be configured to transmit the details of the product to the user for display in the user's web browser. At block 810, the system can be enabled to allow the client to activate the processing controller system in order to modify and/or add an image to the promotional product that has been selected. In an embodiment, the activation of the processing controller system can be accomplished when the user selects the image processing tool button that is available on the supplier's website. At block 812, the processing controller can be configured to access the product and canvas database 808 to obtain the canvas dimension data for the selected product. At block 814, the processing controller can be configured to generate dynamically a virtual canvas specific to the promotional product based on the canvas dimension data received from the database 808. At block 816, the processing controller can be configured to access user images stored in the image database 818. At block 820, the system can be enabled to allow the user to finalize the image for placement on the promotional product. At block 822, the processing controller can be configured to determine the image file type for transmission to the supplier for placement on the promotional product. At block 824, the supplier system can be configured to receive the image file in order to generate and display the virtual sample of the promotional product to the user. In an embodiment, the generation of the virtual sample of the promotional product is performed by the processing controller. At block 826, the system can be configured to allow the user to finalize the order for the promotional product.

Figure 9:
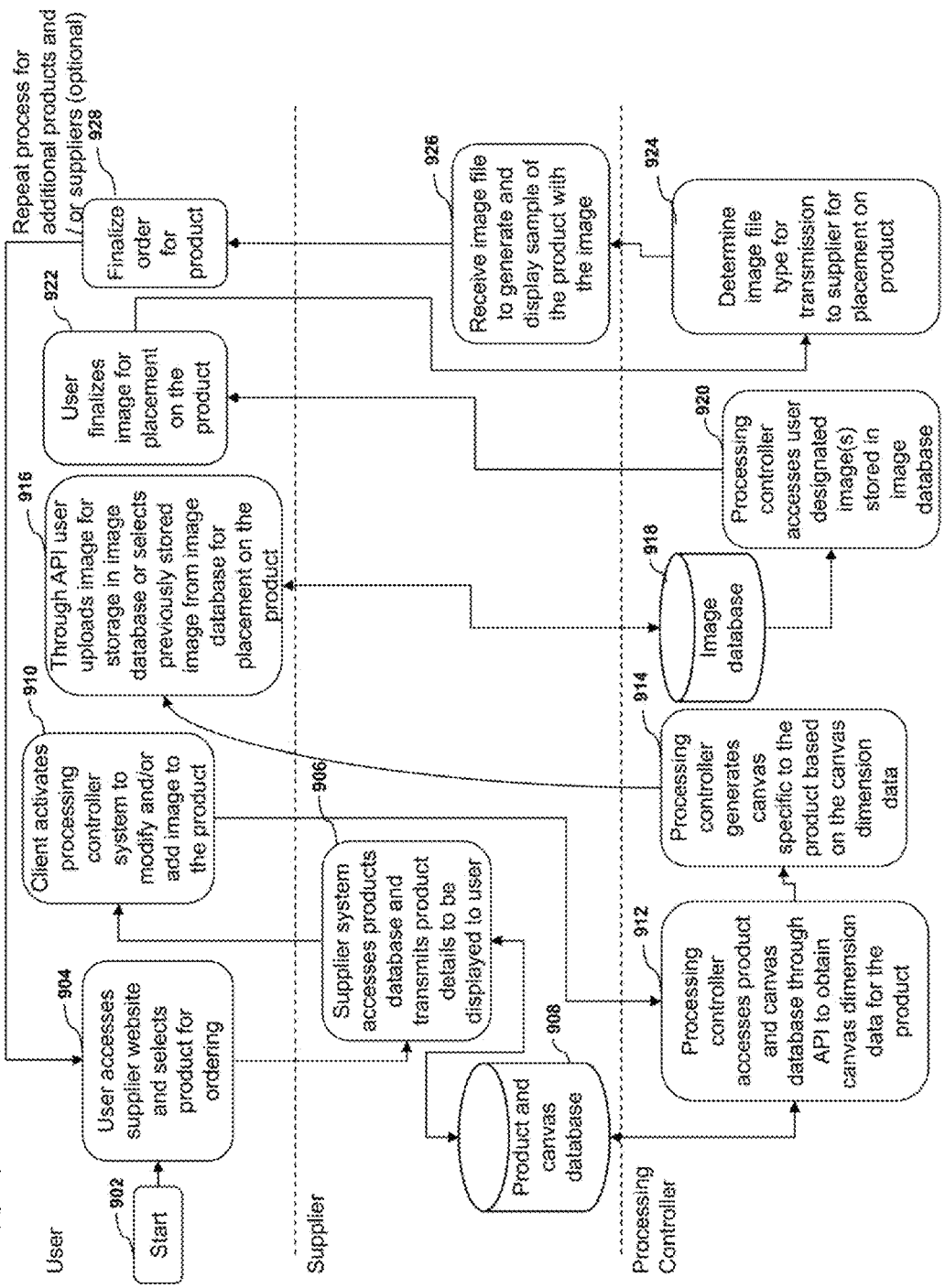
FIG. 9 is an embodiment of a process flow diagram for procuring promotional products through a processing controller.

FIG. 9 is an embodiment of a process flow diagram for procuring promotional products through a processing controller. In an embodiment, the process can start at block 902. At block 904, the system can be configured to allow the user to access the supplier website and select a promotional product for ordering. At block 906, the supplier system can be configured to access the products database 908. The supplier system can also be configured to transmit the product details to the user's web browser for display to the user. At block 910, the system can be configured to allow the client to activate the processing controller system in order to modify and/or add an image to the promotional product. In an embodiment, the system can be configured to allow activation of the processing controller by providing an image processing tool button for the user to select from the supplier's website. At block 912, the processing controller can be configured to access the product and canvas database 908 through an API. In accessing the database 908, the processing controller can be configured to obtain canvas dimension data for the product. At block 914, the processing controller can be configured to generate a canvas specific to the promotional product based on the canvas dimension data obtained from the database 908. At block 916, the system can be configured to allow the user to upload an image by using an API. In an embodiment, the uploaded image can be stored in an image database 918. In an embodiment, the user can select a previously stored image from the image database 918. In an embodiment, the selected image can be placed on the promotional product. At block 920, the processing controller can be configured to access the user designated image that is stored in the image database 918. At block 922, the system can be configured to allow the user to finalize the image for placement on the promotional product. At block 924, the processing controller can be configured to determine the image file type for transmission to the supplier for placement on the promotional product. At block 926, the supplier system can be configured to receive the image file in order to generate and display a virtual sample of the product with the user selected image. In an embodiment, the processing controller can be configured to generate the virtual sample of the promotional product for transmission to the supplier system and ultimate display to the user. At block 928, the system can be configured to allow the user to finalize the order for the product. At block 928, the process can optionally be repeated and returned to block 904. For example, the process can be repeated if the user decides to use the same image on a different promotional product offered by a different supplier. Alternatively, at block 930 the process can end.

Figure 10:
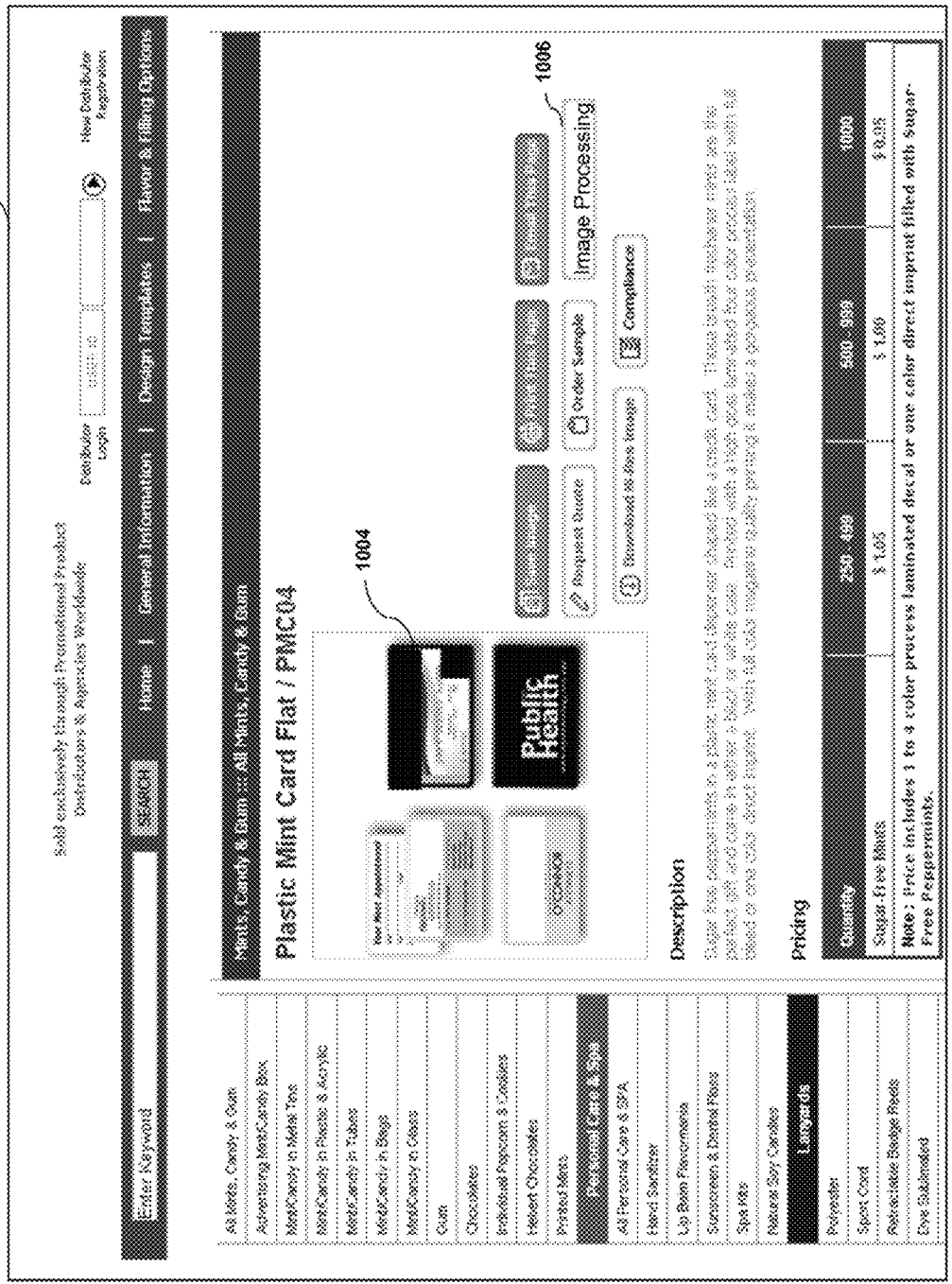
FIG. 10 is an embodiment of a screenshot illustrating a supplier website (or other website) comprising an image processing utility.

FIG. 10 is an embodiment of a screenshot illustrating a supplier website or other website comprising an image processing tool button. In FIG. 10, there is illustrated a supplier website 1002. In an embodiment, the supplier website 1002 can comprise a virtual sample of the promotional product 1004. In an embodiment, the virtual product 1004 does not comprise an image selected by the user. In order to create a virtual sample of the promotional product 1004 with a user designated image, the user can select the image processing tool button 1006.

FIG. 10 is an embodiment of a screenshot of the image processing utility that is accessible from the screenshot of FIG. 10. In an embodiment, when the user selects the image processing tool button 1006, the system can be configured to display before the user the image processing utility screen 1102. In an embodiment, the system can be configured to dynamically generate the virtual canvas 1104. In an embodiment, the virtual canvas 1104 can be specifically dimensioned based on canvas dimension data obtained from a products database. The dimension data can be specific to a particular promotional product. For example, for each promotional product there may only be a limited surface area for placement of a user selected image. To inform the user of the sizing limitations for placing an image on a particular promotional product, the system can generate the virtual canvas 1104. In an embodiment, the user can place images, text, shapes, colors, and the like in the virtual canvas 1104 in order to create an mage for placement on the promotional product.

Figure 11:
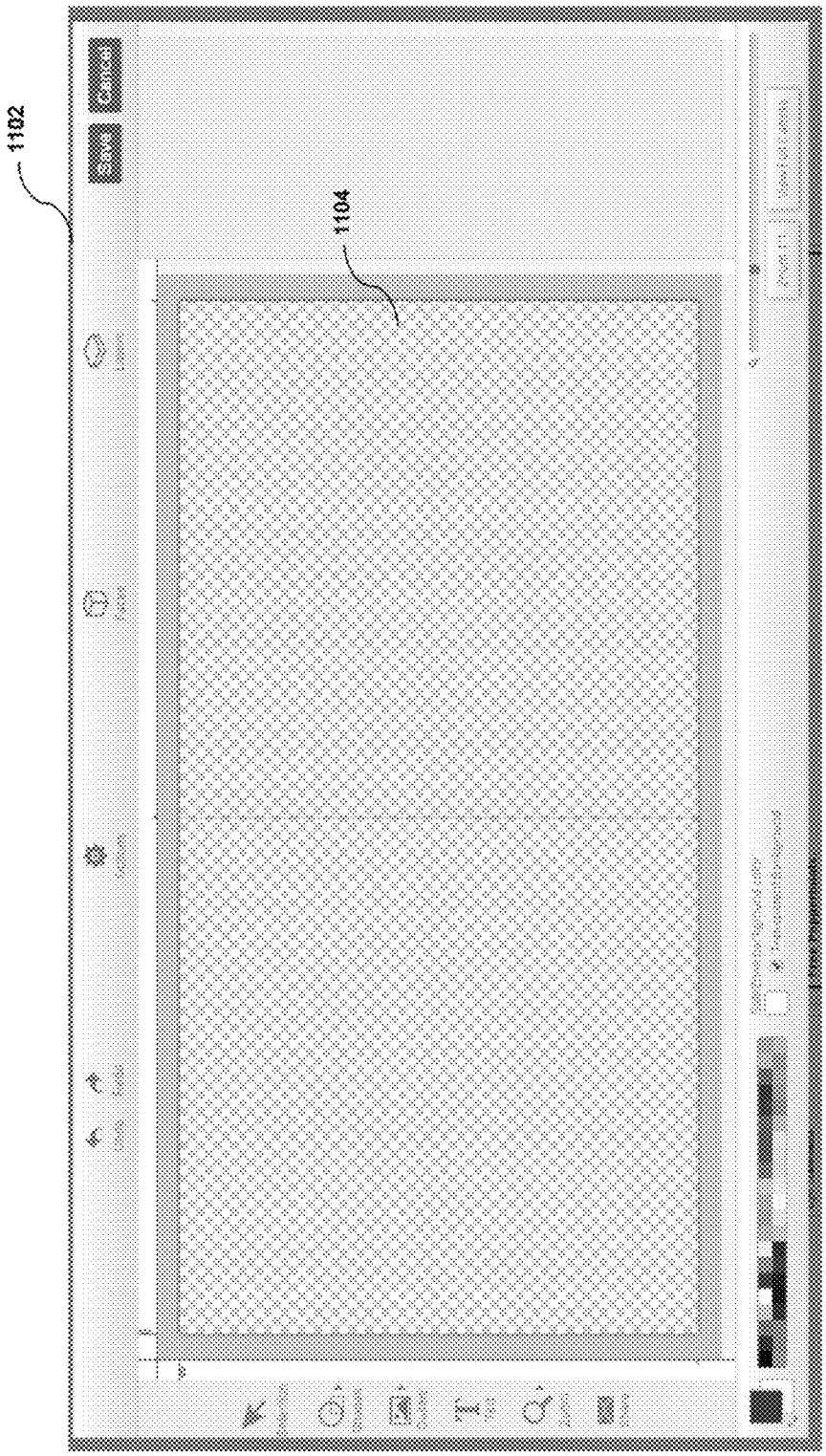
FIG. 11 is an embodiment of a screenshot of the image processing utility accessible from the screenshot of FIG. 10.
Figure 12:
FIG. 12 illustrates the screenshot of FIG. 11, wherein the image processing utility comprises an image for editing.

FIG. 12 illustrates the screenshot of FIG. 11, wherein the image processing utility comprises an image for editing. In an embodiment, the virtual canvas 1104 comprises a combination of an image with text. After the user is satisfied with the generated image, the user can select the save button 1202 in order to save the generated image into an image database of the system.

Figure 13:
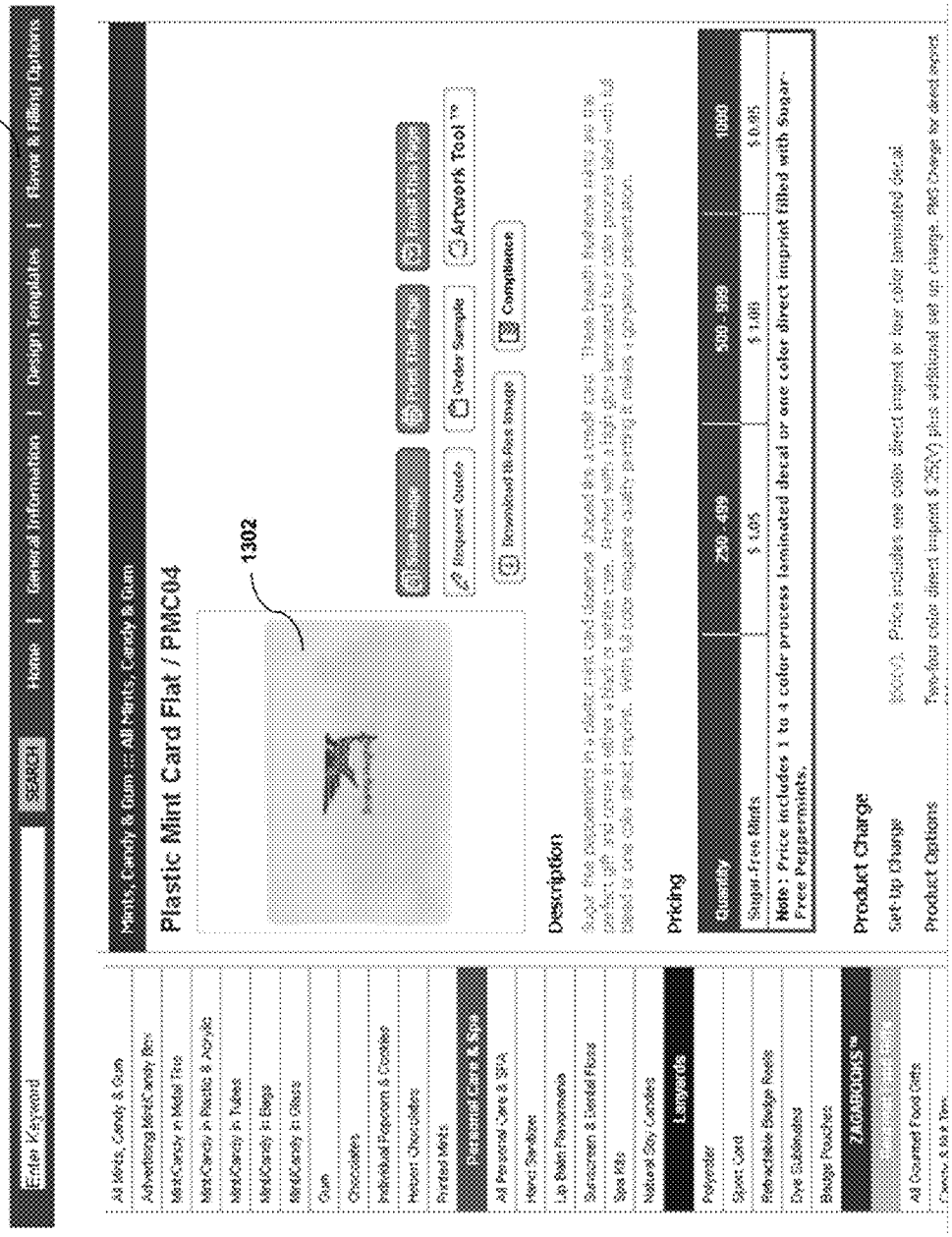
FIG. 13 illustrates the screenshot of the supplier website of FIG. 10, wherein the screenshot comprises a virtual sample of the product showing the image generated using the image processing utility.
Figure 14:
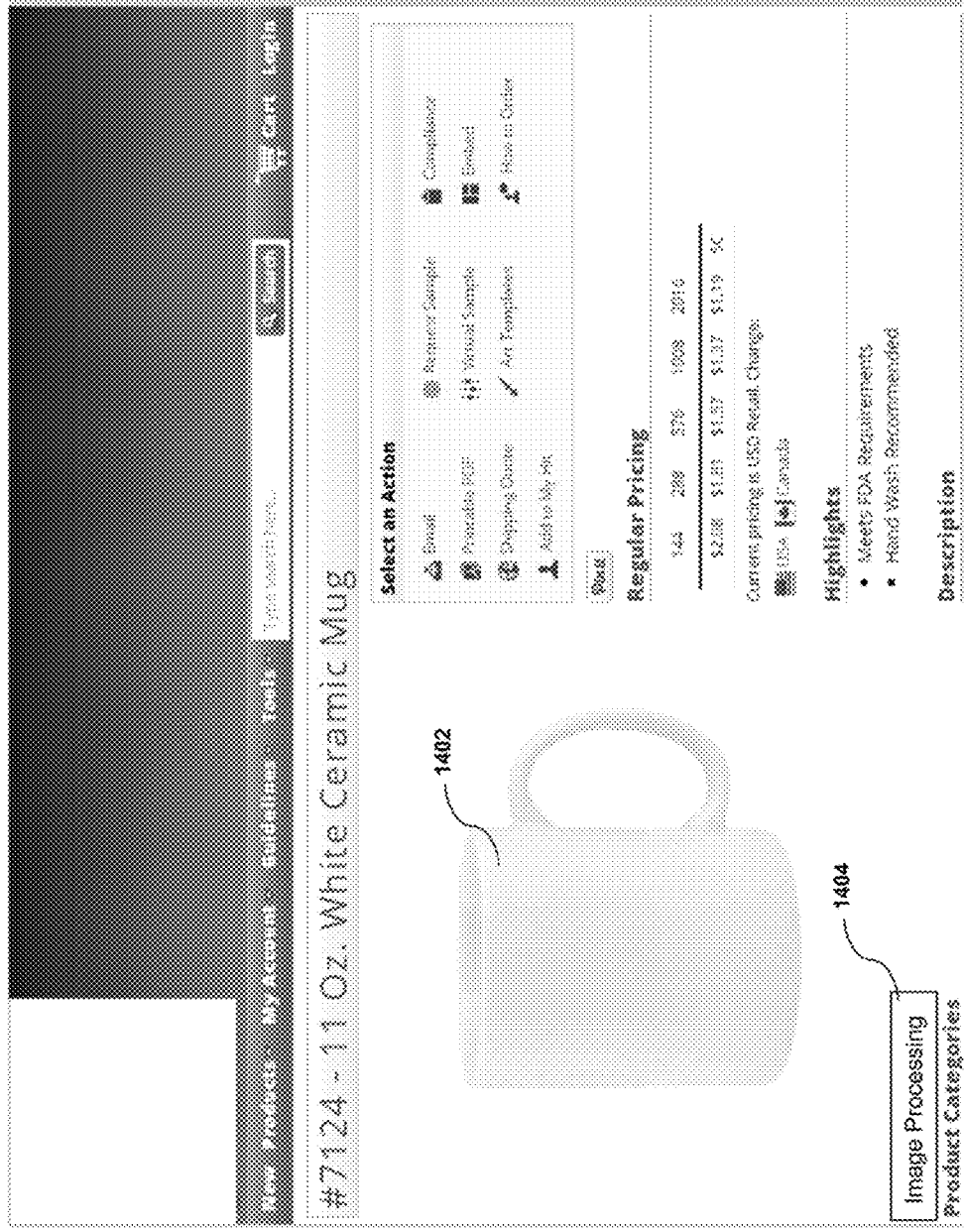
FIG. 14 is an embodiment of a screenshot of a supplier website.
Figure 15:
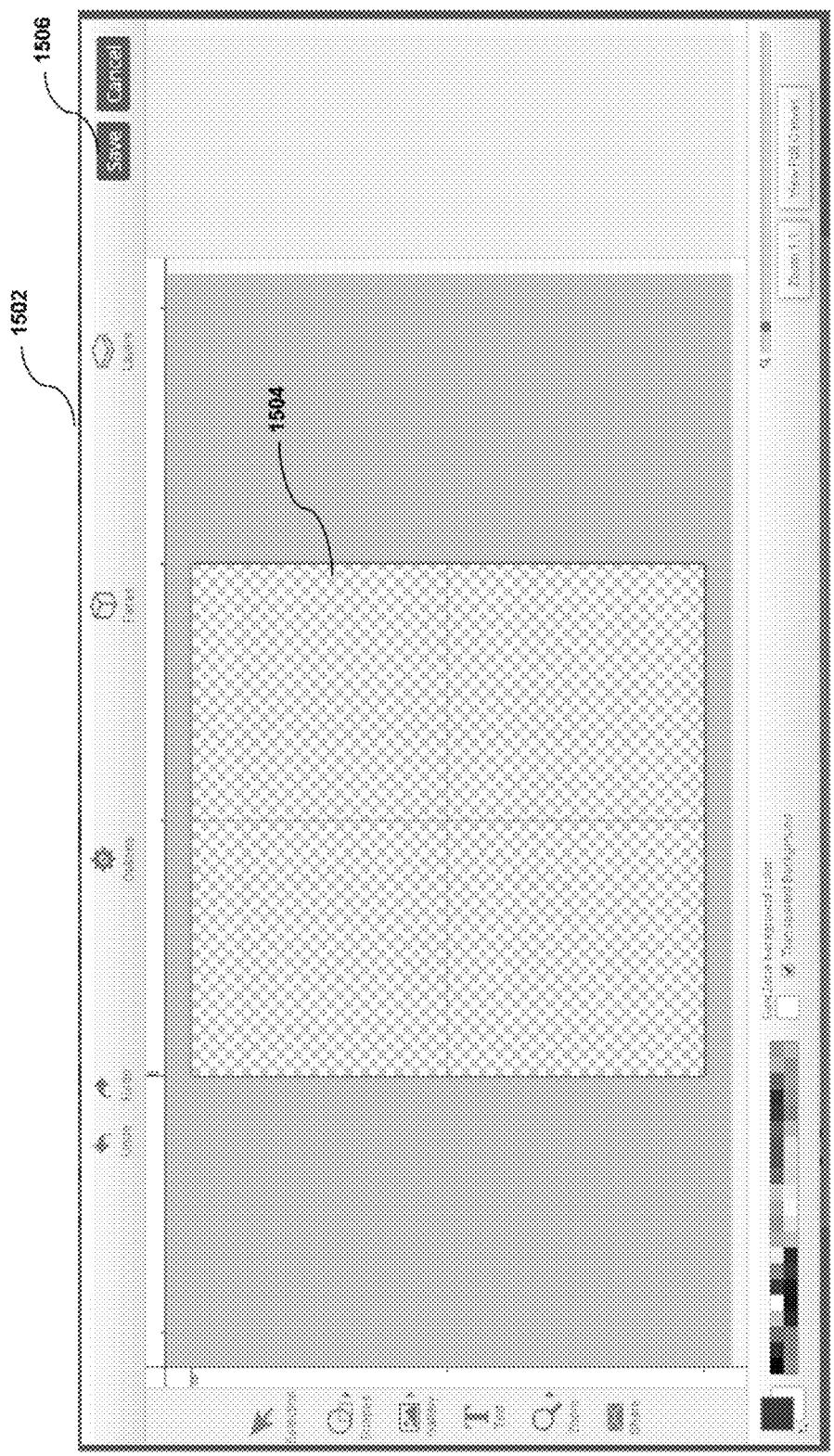
FIG. 15 is an embodiment of a screenshot of an image processing utility that is accessible from the supplier website of FIG. 14.
Figure 16:
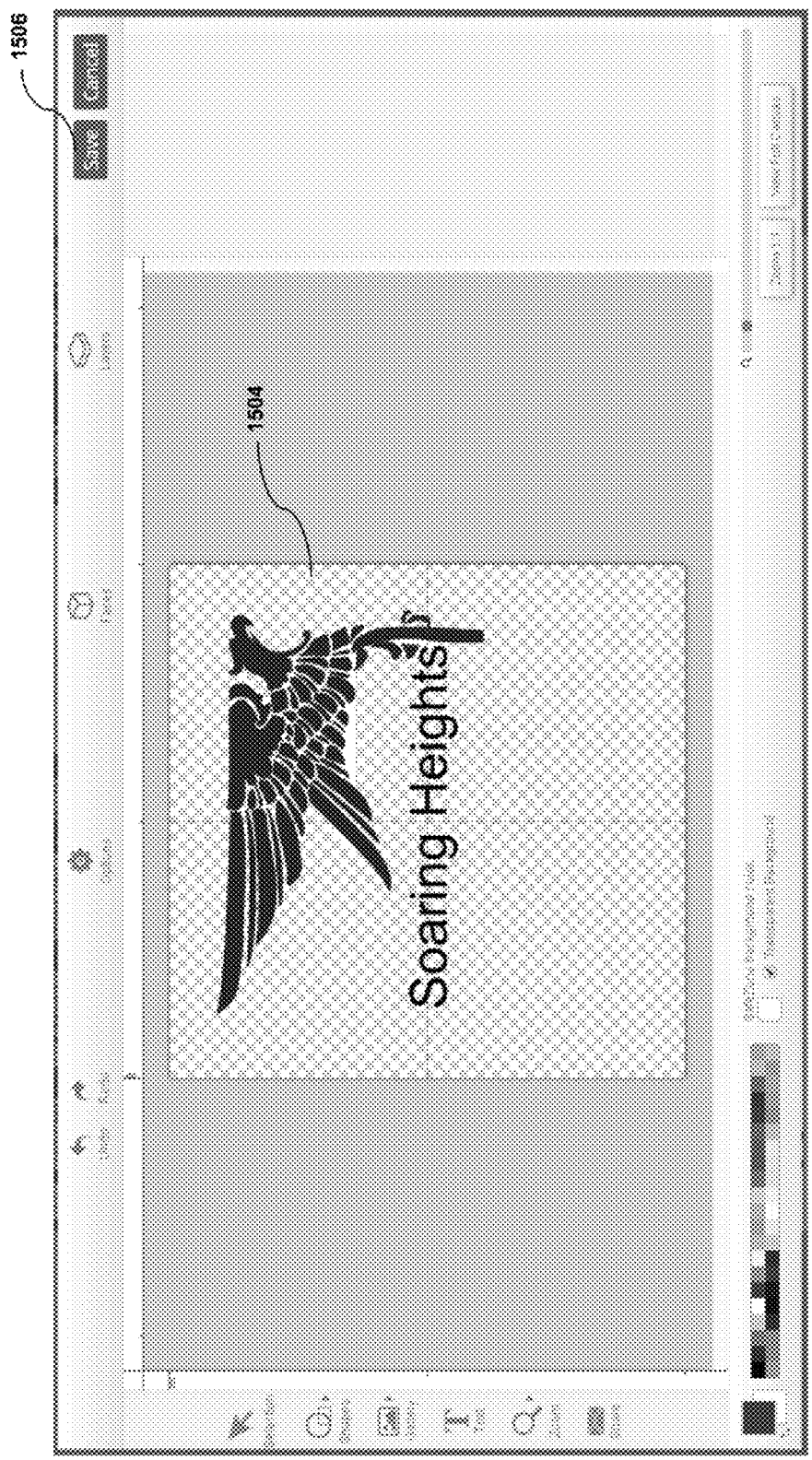
FIG. 16 illustrates the image processing utility of FIG. 15, wherein the image processing utility comprises an image for editing.

FIG. 13 illustrates the screenshot of the supplier website of FIG. 10, wherein the screenshot comprises a virtual sample of the product showing the image generated using the image processing utility. In an embodiment, the supplier website 1002 can be configured to display a virtual product sample

1302. The virtual product sample 1302 can comprise an image of the promotional product selected by the user. In an embodiment, the promotional product can comprise the image generated by the user. If the user is satisfied with the virtual sample, the user can finalize the purchase of the promotional product.

FIGS. 14 through 17 are screenshots that illustrate a supplier website similar to the supplier website illustrated in FIGS. 10 through 13. In FIGS. 14 through 17, the promotional product is a mug 1402. In an embodiment, the user can place an image on the mug 1402 by selecting the image processing tool button 1404. The selection of the image processing tool button 1404, causes the display of the image processing utility 1502. In an embodiment, the image processing utility can be configured to dynamically generate a virtual canvas 1504. Unlike the virtual canvas 1104, the virtual canvas 1504 has a different dimension. In this example, the mug 1402 has a smaller surface area for placement of an image than the plastic mint card promotional product 1004. In an embodiment, the user can insert the same image utilized in the previous example in the virtual canvas 1504. When the user is satisfied with the placement of the image in the virtual canvas 1504, the user can select the save button 1506. By selecting the save button 1506, the system can be configured to generate a virtual sample of the mug 1402 wherein the virtual sample 1702 comprises the user generated image superimposed onto the mug.

In an embodiment, the system can be configured to generate a single view of the virtual sample, and in an embodiment, the system can be configured to generate a virtual sample that allows a user to view the product from different angles by rotating the product, for example, a 360 degree view of the mug. To generate a virtual sample viewable from different angles, in an embodiment, the system can be configured to generate an animated GIF-type image or a film strip of JPEG files or a holographic image file. In an embodiment, the system can be configured to transmit the virtual product sample file, either as a single view or multi-view image file, to a third party website, for example the supplier website, for display to a user through the third party website. In an embodiment, the system is configured to generate and output a file, for example an SVG, EPS, or other print ready artwork file, for later use in manufacturing and/or production of promotional products or use in a website or publication.

In an embodiment, the system can be configured to analyze the image in order to determine the number of colors utilized in printing the image on a marketing product. In an embodiment, the system can be configured to utilize the data regarding the number of utilized colors in order to dynamically calculate, generate, and/or display the cost and/or pricing for manufacturing and/or producing the marketing product with the image.

Figure 18:
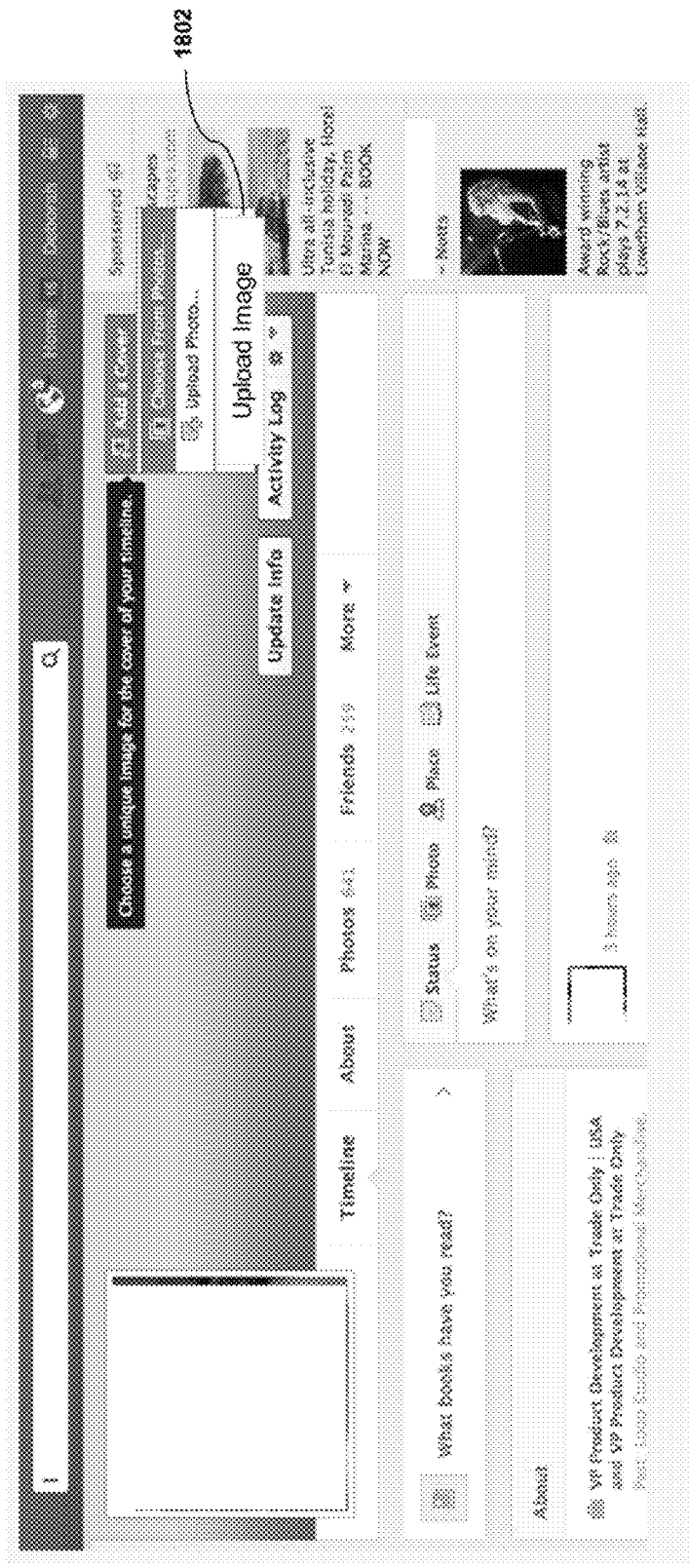
FIG. 18 is an embodiment of a screenshot of a social media website.

FIG. 18 is an embodiment of a screenshot of a social media website. In an embodiment, the system can be configured to interface with social media websites such as Facebook. In an embodiment, a user can select an upload image button 1802 in order to upload a previously generated image to the social media website.

Computer System

Figure 19:
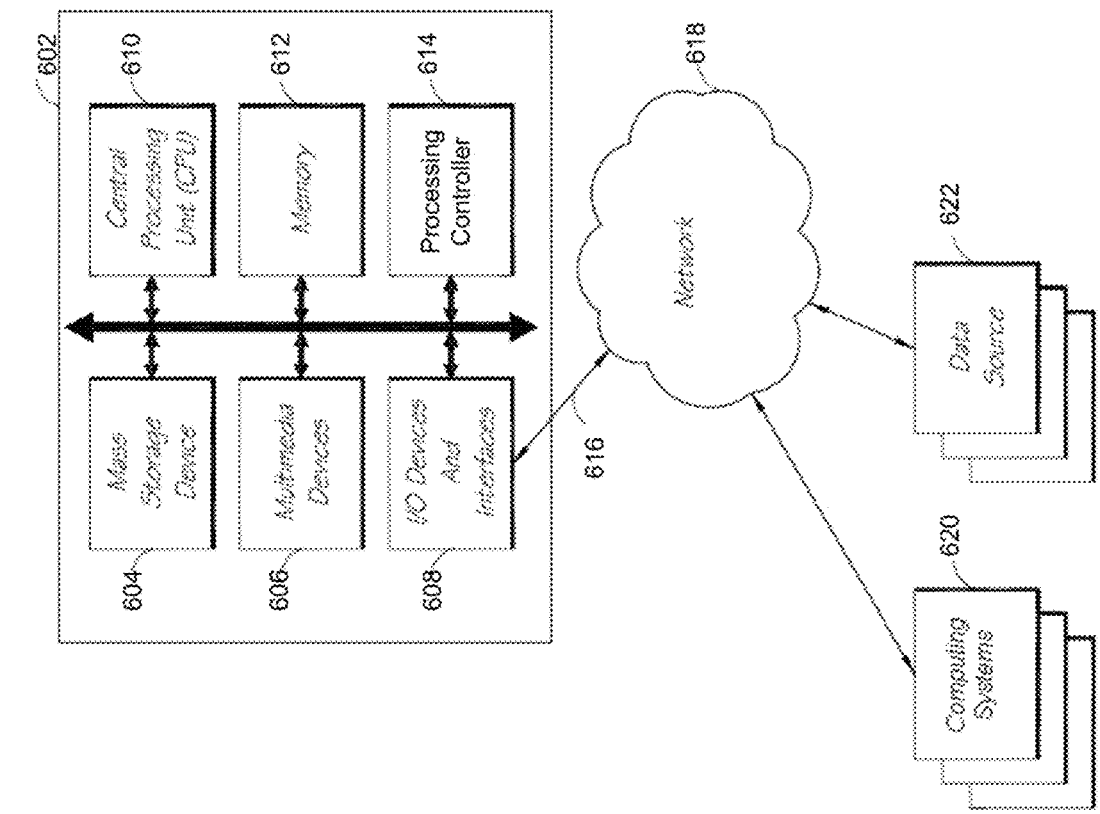
FIG. 19 is a block diagram depicting an embodiment of a computer system configured to run software for implementing one or more embodiment of the processing controller system described herein.

In some embodiments, the systems, processes, and methods described above are implemented using a computing system, such as the one illustrated in FIG. 19. The example computer system 602 is in communication with one or more computing systems 620 and/or one or more data sources 622 via one or more networks 618. While FIG. 19 illustrates an embodiment of a computing system 602, it is recognized that the functionality provided for in the components and modules of computer system 602 may be combined into fewer components and modules, or further separated into additional components and modules.

Processing Controller Module

The computer system 602 includes a processing controller 614 that carries out the functions, methods, acts, and/or processes described herein. The processing controller 614 is executed on the computer system 602 by a central processing unit 610 discussed further below.

In general the word "module," as used herein, refers to logic embodied in hardware or firmware or to a collection of software instructions, having entry and exit points. Modules are written in a program language, such as JAVA, C or C++, or the like. Software modules may be compiled or linked into an executable program, installed in a dynamic link library, or may be written in an interpreted language such as BASIC letters, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

Computing System Components

The computer system 602 includes one or more processing units (CPU) 610, which may include a microprocessor. The computer system 602 further includes a memory 612, such as random access memory (RAM) for temporary storage of information, a read only memory (ROM) for permanent storage of information, and a mass storage device 604, such as a hard drive, diskette, or optical media storage device. Alternatively, the mass storage device may be implemented in an array of servers. Typically, the components of the computer system 602 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 602 includes one or more input/output (I/O) devices and interfaces 608, such as a keyboard, mouse, touch pad, and printer. The I/O devices and interfaces 608 can include one or more display devices, such as a monitor, that allows the visual presentation of data to a user. More particularly, a display device provides for the presentation of GUIs as application software data, and multi-media presentations, for example. The I/O devices and interfaces 608 can also provide a communications interface to various external devices. The computer system 602 may include one or more multi-media devices 606, such as speakers, video cards, graphics accelerators, and microphones, for example.

Computing System Device/Operating System

The computer system 602 may run on a variety of computing devices, such as a server, a Windows server, and Structure Query Language server, a Unix Server, a personal computer, a laptop computer, and so forth. In other embodiments, the computer system 602 may run on a mainframe computer suitable for controlling and/or communicating with large databases, performing high volume transaction processing, and generating reports from large databases. The computing system 602 is generally controlled and coordinated by an operating system software, such as z/OS, Windows 95, Windows 98, Windows NT, Windows 2000, Windows XP, Windows Vista, Windows 7, Linux, BSD, SunOS, Solaris, or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 602 illustrated in FIG. 19 is coupled to a network 618, such as a LAN, WAN, or the Internet via a communication link 616 (wired, wireless, or a combination thereof). Network 618 communicates with various computing devices and/or other electronic devices. Network 618 is communicating with one or more computing systems 620 and one or more data sources 622. The processing controller 614 may access or may be accessed by computing systems 620 and/or data sources 622 through a web-enabled user access point. Connections may be a direct physical connection, a virtual connection, and other connection type. The web-enabled user access point may include a browser module that uses text, graphics, audio, video, and other media to present data and to allow interaction with data via the network 618.

The output module may be implemented as a combination of an all-points addressable display such as a cathode ray tube (CRT), a liquid crystal display (LCD), a plasma display, or other types and/or combinations of displays. The output module may be implemented to communicate with input devices 608 and they also include software with the appropriate interfaces which allow a user to access data through the use of stylized screen elements, such as menus, windows, dialogue boxes, tool bars, and controls (e.g., radio buttons, check boxes, sliding scales, and so forth). Furthermore, the output module may communicate with a set of input and output devices to receive signals from the user.

Other Systems

The computing system 602 may include one or more internal and/or external data sources (e.g., data sources 622). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 602 as shown in FIG. 19 accesses one or more attribute filters 626. The attribute filters 626 may be stored in a database or data repository. The computer system 602 may access the one or more attribute filters 626 through a network 618 or may directly access the database or data repository through I/O devices and interfaces 608. The data repository storing the one or more attribute filters may reside within the computer system 602.

The computer system 602 also accesses one or more consumer verification databases 624. The consumer verification databases 624 may be stored in a database or data repository. The computer system 602 may access the one or more consumer verification databases 624 through a network 618 or may directly access the database or data repository through I/O devices and interfaces 608. The data repository storing the one or more consumer verification databases 624 may reside within the computer system 602.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

Additionally, the generation of a virtual canvas for third party websites can be challenging because the systems disclosed herein can configured to work with hundreds or thousands of website, each with hundreds or thousands of simultaneous web users. Therefore, the systems herein must be configured to generate and manage thousands or millions of virtual canvases and images simultaneously. In an embodiment, the systems can be configured to process virtual canvases and image data from various third party websites once every 1 second, 2 seconds, 3 seconds, 4 seconds, or 5 seconds. The sheer volume of data coming into the systems makes it impossible for a human being, whether entirely in the person's mind or whether the person is using a pen and paper, to track and/or perform, in real-time or substantially real-time (for example, within 1 to 30 seconds, or 1 second to 1 minute), the activities of the embodiments of the systems that are disclosed herein. Similarly, it is impossible for a human being, whether entirely in the person's mind or whether the person is using a pen and paper, to generate in real-time or substantially real time (for example, within 1 to 30 seconds), to generate for hundreds or thousands of simultaneous users a rotatable image of an item having superimposed a user generated or defined image on the item, whereas when the item is rotated the superimposed image is adjusted to correspond to the position of the item.

Additional Embodiments

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods may be carried out using any appropriate apparatus. Further, the disclosure herein of any particular feature, aspect, method, property, characteristic, quality, attribute, element, or the like in connection with an embodiment may be used in all other embodiments set forth herein. Thus, it is intended that the scope of the present invention herein disclosed should not be limited by the particular disclosed embodiments described above.

What is claimed is:

1. A printer interface system for dynamic canvas processing control, the system comprising:
 a printer interface configured to communicate through a computer network with a printer system, the printer system comprising a printer for customizing user selected items;

the printer comprising a network interface configured to receive print instructions and a print head configured to apply images to items based on the print instructions;

an external website interface configured to receive a user selected item from a third party website utilized by a user;

an image database configured to store electronic images for use with a plurality of third party websites that display rotatable image views of items;

an items specifications database configured to store item data relating to the rotatable image views of items;

the external website interface configured to dynamically analyze the third party website to determine a canvas size based on available space of the user selected item and to store the canvas size as item data in the items specifications database;

a canvas processing engine configured to access the items specifications database to obtain the item data for the user selected item, and the canvas processing engine configured to dynamically analyze the item data to generate a virtual canvas comprising the canvas size based on the item data;

an image processing engine configured to cause display through the third party website to the user the virtual canvas, the virtual canvas configured to allow the user to generate an image in the virtual canvas;

a storing engine configured to receive instructions from the user to electronically store the image in the virtual canvas into the image database, the image stored in a format that enables use of the image with a plurality of items having different item data;

the image processing engine configured to generate rotatable image views of the user selected item by applying the image in the virtual canvas to stock rotatable image views of the user selected item, the external website interface configured to transmit rotatable image views of the item to the third party website to display the item to the user through the third party website, the transmitted rotatable image views of the item comprising the image in the virtual canvas, the image positioned on the item;

the printer interface configured to dynamically determine an output file type appropriate for the printer system and to generate a print ready output file of the determined output file type, the print ready output file comprising print instructions based on the image and the item data, and to transmit to the printer system the print ready output file, enabling the printer to print the image on one or more items; and one or more computers configured to operate the printer interface system for dynamic canvas processing control, wherein the one or more computers comprises a computer processor and an electronic storage medium.

2. The printer interface system of claim 1, wherein the item is a promotional product.

3. A dynamic canvas processing controller comprising:
an external website interface configured to receive user inputted area data from a third party website utilized by a user;

an image database configured to store electronic images for use with a plurality of third party websites;

a canvas dimension database configured to store area data relating to dimensions of canvases for areas;

the external website interface configured to dynamically analyze the third party website to determine a canvas size based on available space of the user inputted area and to store the canvas size as area data in the canvas dimensions database;

a canvas processing engine configured to access the canvas dimension database to obtain dimension data based on the user inputted area data, and configured to generate a virtual canvas comprising the canvas size based on the dimension data;

an image processing engine configured to cause display through the third party website to the user the virtual canvas, the virtual canvas configured to allow the user to generate an image in the virtual canvas;

a storing engine configured to receive instructions from the user to electronically store the image in the virtual canvas into the image database, the image stored in a format that enables use of the image with a plurality of areas having different area data;

the external website interface configured to transmit the image in the virtual canvas to the third party website to display the image to the user through the third party website; and one or more computers configured to operate the dynamic canvas processing controller, wherein the one or more computers comprises a computer processor and an electronic storage medium.

4. The processing controller of claim 3, wherein the areas are surface areas on promotional products.

5. The processing controller of claim 3, wherein the areas are portions of websites.

6. The processing controller of claim 3, wherein the areas are portions of online marketing campaigns.

7. A dynamic canvas processing controller comprising:
a canvas dimension database interface configured for accessing a database configured to store area data relating to dimensions of canvases for editable areas;

a canvas processing engine configured to access through the canvas dimension database interface the database to obtain area data based on canvas data corresponding to a user selected editable canvas, and configured to dynamically generate, based on the obtained area data, a virtual canvas comprising a canvas size having dimensions corresponding to the user selected editable canvas;

an image processing engine configured to cause display through a third party website to the user the virtual canvas, the virtual canvas configured to allow the user to generate an image in the virtual canvas;

a storing engine configured to receive instructions from the user to electronically store the image in the virtual canvas into an image database, the image stored in a format that enables use of the image with a plurality of editable areas having different dimensions;

a display engine configured to cause display to the user the image in the context of the third party website; and one or more computers configured to operate the dynamic canvas processing controller, wherein the one or more computers comprises a computer processor and an electronic storage medium.

8. The dynamic canvas processing controller of claim 7, wherein the editable areas are surface areas on promotional products.

9. The processing controller of claim 7, wherein the editable areas are portions of websites.

10. The processing controller of claim 7, wherein the editable areas are portions of online marketing campaigns.

11. The printer interface system of claim 1, wherein the image processing engine is further configured to resize the stored image for use with rotatable image views of a second user selected item, the second user selected item having different available space than the first user selected item.

12. The printer interface system of claim 1, further comprising:

a prediction engine configured to analyze the image, the item data, and supplier data to generate price estimates for each of a plurality of suppliers to produce the user selected item represented by the rotatable image views, the prediction engine configured to transmit the price estimates for display to the user, the prediction engine further configured to mine procurement data to generate a probability for each of the price estimates that the price estimate will be accepted by the user.

13. The printer interface system of claim 1, wherein the output file type comprises one of the following file types: SVG, EPS.

14. The printer interface system of claim 1, wherein the rotatable image views comprise at least one of the following: animated GIF, JPEG film strip, holographic image.

15. The printer interface system of claim 1, wherein the image stored in the image database comprises a higher resolution than a corresponding image included in the print ready output file.

16. The printer interface system of claim 1, wherein the print ready output file comprises a cropped version of the image stored in the image database.

17. The processing controller of claim 3, wherein the image processing engine is further configured to resize the stored image for use with a second user inputted area, the second user inputted area having different available space than the first user inputted area.

\* \* \* \* \*